US011250663B1

(12) United States Patent
Bales et al.

(10) Patent No.: US 11,250,663 B1
(45) Date of Patent: Feb. 15, 2022

(54) RADIO MESH NETWORK GAMING SYSTEM

(71) Applicant: Shoot The Moon Products, II, LLC, Pleasanton, CA (US)

(72) Inventors: Ryan Bales, Benecia, CA (US); David Small, San Jose, CA (US)

(73) Assignee: Shoot the Moon Products, II, LLC, Pleasanton, CA (US)

( * ) Notice: Subject to any disclaimer, the term of this patent is extended or adjusted under 35 U.S.C. 154(b) by 103 days.

(21) Appl. No.: 16/724,039

(22) Filed: Dec. 20, 2019

(51) Int. Cl.
| G07F 17/32 | (2006.01) |
| H04L 12/741 | (2013.01) |
| H04W 84/18 | (2009.01) |
| A63F 13/21 | (2014.01) |
| A63F 13/335 | (2014.01) |
| H04W 40/24 | (2009.01) |

(52) U.S. Cl.
CPC .......... *G07F 17/3225* (2013.01); *A63F 13/21* (2014.09); *A63F 13/335* (2014.09); *G07F 17/3223* (2013.01); *H04L 45/54* (2013.01); *H04W 40/246* (2013.01); *H04W 84/18* (2013.01)

(58) Field of Classification Search
USPC .......................................................... 463/20
See application file for complete search history.

(56) References Cited

U.S. PATENT DOCUMENTS

| 8,684,843 | B2* | 4/2014 | Arezina | G07F 17/3237 463/42 |
| 2010/0311505 | A1* | 12/2010 | Oberberger | H04L 67/104 463/42 |
| 2014/0155145 | A1* | 6/2014 | Arezina | G07F 17/3216 463/25 |
| 2017/0046915 | A1* | 2/2017 | Oberberger | G07F 17/32 |
| 2018/0108211 | A1* | 4/2018 | Thomas | G07F 17/34 |
| 2018/0284161 | A1* | 10/2018 | Shinagawa | G01R 15/186 |

* cited by examiner

*Primary Examiner* — Pierre E Elisca
(74) *Attorney, Agent, or Firm* — Adibi IP Group, PC; Amir V. Adibi; Andrew C. Palmer

(57) ABSTRACT

A radio mesh network gaming system comprises a gaming device that includes a controller. The controller maintains a routing table and game state information. The gaming device forms a radio mesh network along with other gaming devices. The routing table stores next hop information for communicating with other devices over the radio mesh network. The radio mesh network determines a playing area of a game and the playing area changes as gaming devices move throughout the playing area and are added or removed from the game. In one example communication between from a first and third device, the first device communicates the information to a second device in accordance with next hop information stored in the routing table of the first device. The second device then communicates the information to the third device in accordance with next hop information stored in a routing table of the second gaming device.

17 Claims, 32 Drawing Sheets

GAMING DEVICE
(LEFT SIDE VIEW)

GAMING DEVICE

ROUTING TABLE STORED IN EACH GAMING DEVICE

MESH NETWORK FORMED BY GAMING DEVICES

MESH NETWORK FORMED BY GAMING DEVICES

GAMING DEVICE CIRCUITRY

INFRARED (IR) TRANSMITTER CIRCUIT

INFRARED RECEIVER CIRCUIT

IR DOME RECEIVER CIRCUIT

OLED DISPLAY CONTROLLER

WIRELESS COMMUNICATION CIRCUIT

GAMING DEVICE
(RIGHT SIDE VIEW)

GAMING DEVICE
(LEFT SIDE VIEW)

GAMING DEVICE
(REAR VIEW)

COMMUNICATION OVER MESH NETWORK

RADIO MESH NETWORK GAMING SYSTEM

TECHNICAL FIELD

The present invention relates generally to gaming systems.

BACKGROUND INFORMATION

Gaming systems often involve two or more gaming devices. Each player holds one of the gaming devices and uses the gaming device to play the game. In the example of laser tagging gaming systems, the gaming device is a laser tagger device. Each player has a laser tagger device and targets other players during the game. In one version of laser tag, when a player is hit by another player, the hit player loses health. When all of a player's health has been depleted, the player loses and is out of the game. The player or team with most hits wins the game.

SUMMARY

A radio mesh network gaming system comprises a gaming device that includes a controller. The controller maintains a routing table and game state information. The gaming device forms a node of a mesh network. The routing table stores next hop information usable to communicate information to other gaming devices in the mesh network. The mesh network determines a playing area of a game and the playing area is alterable and changes based on how gaming devices move throughout the playing area and on how gaming devices are added or removed from the game.

In one embodiment of a gaming device, the gaming device includes a controller, a radio communication circuit, a battery, and an enclosure. The gaming device is a handheld and portable device. The battery generates and supplies a supply voltage to circuitry within the gaming device. The battery is optionally rechargeable. The controller, radio communication circuit, and battery are disposed within the enclosure of the gaming device. The gaming device forms part of a radio mesh network. The controller stores a routing table and game state information. The routing table stores routing information used to route information to other gaming devices over the radio mesh network. The game state information is state information for a game in which the gaming device is a part of.

In another embodiment of a gaming device, the gaming device is a laser tagger device. The laser tagger device comprises a controller, a radio communication circuit, an optical receiver, an optical transmitter, a battery, and an enclosure. The laser tagger device is a handheld and portable device. The battery generates and supplies a supply voltage to circuitry within the laser tagger device. The controller, radio communication circuit, optical receiver, optical transmitter, and battery are disposed within the enclosure of the laser tagger device. The laser tagger device forms part of a radio mesh network. The controller stores a routing table and game state information. The routing table stores routing information used to route information to other laser tagger devices over the radio mesh network. In the example of laser tag, the game state information indicates various states of the laser tagging game.

The optical receiver detects optical signals output by other laser tagger devices. When a signal is detected by the optical receiver, the detected signal causes the controller to alter game state information and communicate updated game state information across the mesh network to other laser tagger devices. The game state information is communicated to at least one other laser tagger device over the radio mesh network. For example, the updated game state information indicates that the laser tagger device was hit, that a health level of the receiving laser tagger device should be decreased, and a hit count of the transmitting laser tagger device is to be increased.

The optical transmitter outputs optical signals directed to other laser tagger devices. When a signal is output by the optical transmitter and is detected by another laser tagger device, the transmitted signal causes a change in game state information. The game state information is communicated to at least one other laser tagger device over the radio mesh network. For example, the updated game state information indicates that the other laser tagger device was hit, that a health level of the other laser tagger device should be decreased, and a hit count of the transmitting laser tagger device is to be increased.

In one embodiment of a gaming system, the gaming system includes two or more gaming devices. Any one of the gaming devices is operable to configure a game. The game is entirely configurable with one of the gaming devices and without communication with an external system or device. Communication between gaming devices is performed in accordance with next hop information stored in the routing table of each device. The next hop information stored in each gaming device indicates how to communicate with the other gaming devices and how to route information between devices over the mesh network. In one example, the gaming system includes a first gaming device, a second gaming device, and a third gaming device. It is understood that more or less gaming devices may be included at initialization of a game, and it is also understood that gaming devices may be removed or added later during game play. Each of the first, second, and third gaming devices communicates game state information over the radio mesh network. To communicate information from the first gaming device to the third gaming device, the first gaming device communicates the information to the second gaming device in accordance with next hop information stored in the routing table of the first gaming device. Next, the second gaming device communicates the information to the third gaming device in accordance with next hop information stored in a routing table of the second gaming device. The gaming device does not include any cellular network communication circuitry and no cellular network is involved in communicating over the radio mesh network.

The foregoing is a summary and thus contains, by necessity, simplifications, generalizations and omissions of detail; consequently it is appreciated that the summary is illustrative only. Still other methods, and structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 16, are a flowchart of a method 400.

FIG. 20, are a flowchart of a method 800.

FIG. 21, are a flowchart of a method 900.

FIG. 24, are a flowchart of a method 1200.

DETAILED DESCRIPTION

Reference will now be made in detail to some embodiments of the invention, examples of which are illustrated in the accompanying drawings.

Figures 1, 2:
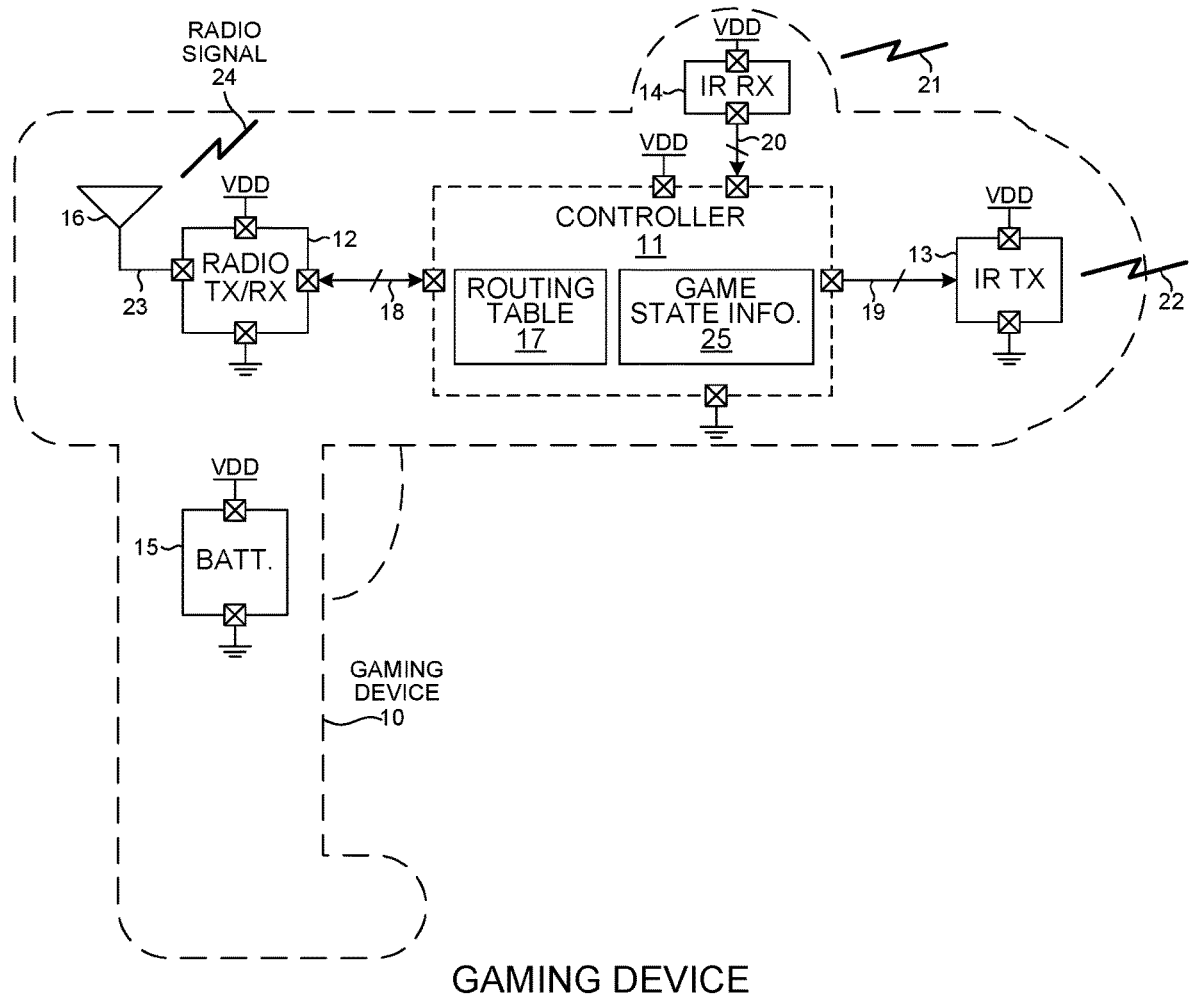
FIG. 1 is a block diagram of a gaming device 10.
FIG. 2 is a diagram showing next hop information 30 stored in the routing table 17 of the gaming device 10.

FIG. 1 is a block diagram of a gaming device 10. Gaming device 10 comprises a controller 11, a radio transmitter and receiver 12, an infrared transmitter 13, an infrared receiver 14, a battery 15, and an antenna 16. The gaming device 10 is a handheld and portable device. The battery 15 generates a supply voltage VDD that supplies circuitry within the gaming device 10. The gaming device 10 is operable to form part of a radio mesh network. The controller 11 stores a routing table 17 and game state information 25. The routing table 17 stores routing information used to route information across other gaming devices within the radio mesh network. The game state information 25 is state information for a game in which the gaming device 10 is part of. In one example, the gaming device 10 is a laser tagger, the game is a laser tagging game, and the game state information indicates various states of the laser tagging game.

The controller 11 communicates with other gaming devices over the radio mesh network using the radio transmitter and receiver 12. The controller 11 communicates information to the radio transmitter and receiver 12 via communication link 18. The radio transmitter and receiver 12 receives information to be communicated and communicates this information across the radio mesh network via the antenna 16 over communication link 23. Reference numeral 24 identifies one such radio signal that is communicated to another device in the radio mesh network. Game state is communicated over the radio mesh network to other gaming devices involved in the game. Game state information 25 is updated in accordance with game state updates received from other devices in the radio mesh network.

The gaming device 10 is configured to communicate via optical communication with other devices. The gaming device 10 transmits optical signals to other devices using the infrared transmitter 13 via communication link 19. Reference numeral 22 identifies one such optical signal to be transmitted to another device. In the example of a laser tagging game, the transmitted optical signal 22 indicates that the gaming device 10 has tagged another gaming device in the laser tagging game. The controller 11 updates the game state information 25 accordingly. For example, the controller 11 increases a hit count value of gaming device 10. The controller 11 communicates the updated game state information to other gaming devices over the radio mesh network.

The gaming device 10 receives optical signals from other gaming devices using the infrared receiver 14 via communication link 20. Reference numeral 21 identifies one such optical signal that is received from another device. In the example of a laser tagging game, the received optical signal 21 indicates that another gaming device in the laser tagging game has tagged gaming device 10. The controller 11 updates the game state information 25 accordingly. For example, the controller 11 reduces a health value of the gaming device 10. The controller 11 communicates the updated game state information to other gaming devices over the radio mesh network.

FIG. 2 is a diagram showing next hop information 30 stored in the routing table 17 of the gaming device 10. Each gaming device stores similar next hop information 30 that the device uses to communicate with other devices over the radio mesh network. The next hop information 30 comprises a node identifier (ID) 31, a next hop node ID 32, numbers of hops to node 33, last sequence number heard from node 33, time this node was last heard from 34, and time node last heard from 35. The gaming device 10 communicates with other gaming devices using the next hop information 30 as described below in connection with FIG. 3. Each gaming device in the radio mesh network has a unique node ID used to identify the gaming device. For a particular entry in the routing table 17, the node ID 31 indicates a destination of a communication to be transmitted across the radio mesh network. The next hop node ID 32 indicates the next node the gaming device 10 is to forward the communication to arrive at the destination node. The number of hops to node 33 indicates the number of nodes the communication is to be forwarded to in order to arrive at the destination. The number of hops to node 33 represents the number of nodes between the source device and the destination device. The last sequence number heard from node 33 indicates the last sequence number that was heard from the destination device. The time this node was last heard from 34 indicates an amount of time elapsed since the source device was last heard from over the radio mesh network. The time node last heard from 35 indicates an amount of time elapsed since the destination device was last heard from over the radio mesh network.

Figure 3:
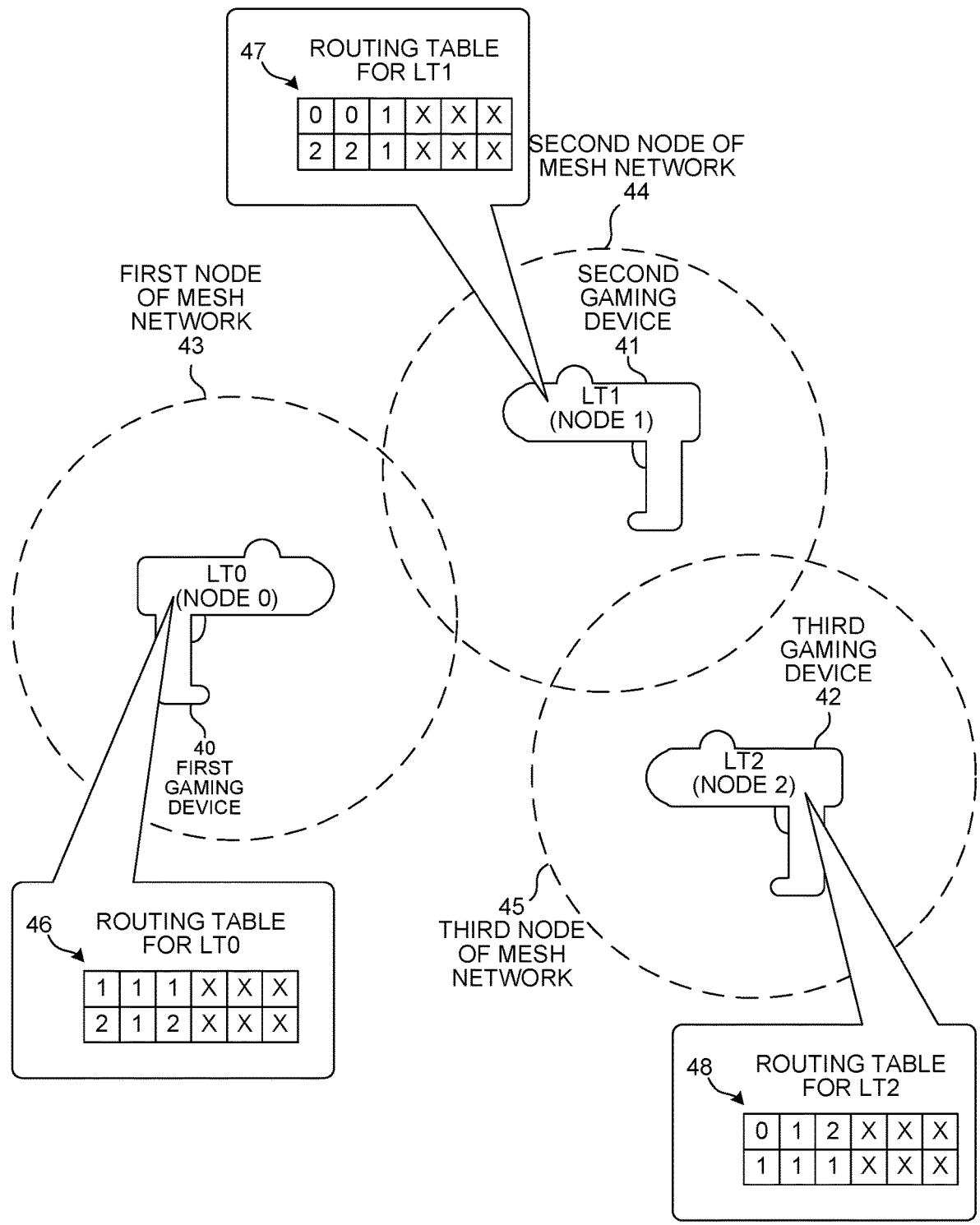
FIG. 3 is a diagram showing a radio mesh network formed by novel gaming devices.

FIG. 3 is a diagram showing a radio mesh network formed by novel gaming devices. The radio mesh network involves a first gaming device 40, a second gaming device 41, and a third gaming device 42. The first gaming device 40 forms a first node 43 of the radio mesh network. The first node 43 is also referred to as LT0 or node "0". The second gaming device 41 forms a second node 44 of the radio mesh network. The second node 44 is also referred to as LT1 or node "1". The third gaming device 42 forms a third node 45 of the radio mesh network. The third node 45 is also referred to as LT2 or node "2".

The first gaming device 40 stores a routing table 46 having next hop information indicating how to communicate with other nodes over the radio mesh network. The first gaming device 40 communicates information to the second gaming device 41 and to the third gaming device 42 in accordance with the next hop information stored in the routing table 46. In this example, to send a communication to the second gaming device 41, or node "1", the next hop information stored in the routing table 46 indicates that the first gaming device 40 is to forward the communication to the second gaming device 41 and that the destination will be reached in a single hop. To send a communication to the third gaming device 42, or node "2", the next hop information stored in the routing table 46 indicates that the first gaming device 40 is to forward the communication to the second gaming device 41 and that the destination will be reached in two hops. Next, after the second gaming device 41 receives the communication destined for the third gaming device 42, the second gaming device 41 performs a lookup using stored next hop information. The second gaming device 41 determines that the communication is to be forwarded on to the third gaming device 42 in a single hop.

The second gaming device 41 stores a routing table 47 having next hop information indicating how to communicate with other nodes over the radio mesh network. The second gaming device 41 communicates information to the first gaming device 40 and to the third gaming device 42 in accordance with the next hop information stored in the routing table 47. In this example, to send a communication to the first gaming device 40, or node "0", the next hop information stored in the routing table 40 indicates that the second gaming device 41 is to forward the communication to the first gaming device 40 and that the destination will be reached in a single hop. To send a communication to the third gaming device 42, or node "2", the next hop information stored in the routing table 47 indicates that the second gaming device 41 is to forward the communication to the third gaming device 42 and that the destination will be reached in a single hop.

The third gaming device 42 stores a routing table 48 having next hop information indicating how to communicate with other nodes over the radio mesh network. The third gaming device 42 communicates information to the second gaming device 41 and to the first gaming device 40 in accordance with the next hop information stored in the routing table 48. In this example, to send a communication to the second gaming device 41, or node "1", the next hop information stored in the routing table 48 indicates that the third gaming device 42 is to forward the communication to the second gaming device 41 and that the destination will be reached in a single hop. To send a communication to the first gaming device 40, or node "0", the next hop information stored in the routing table 48 indicates that the third gaming device 42 is to forward the communication to the second gaming device 41 and that the destination will be reached in two hops. Next, after the second gaming device 41 receives the communication destined for the first gaming device 40, the second gaming device 41 performs a lookup using stored next hop information. The second gaming device 41 determines that the communication is to be forwarded on to the first gaming device 40 in a single hop.

Figure 4:
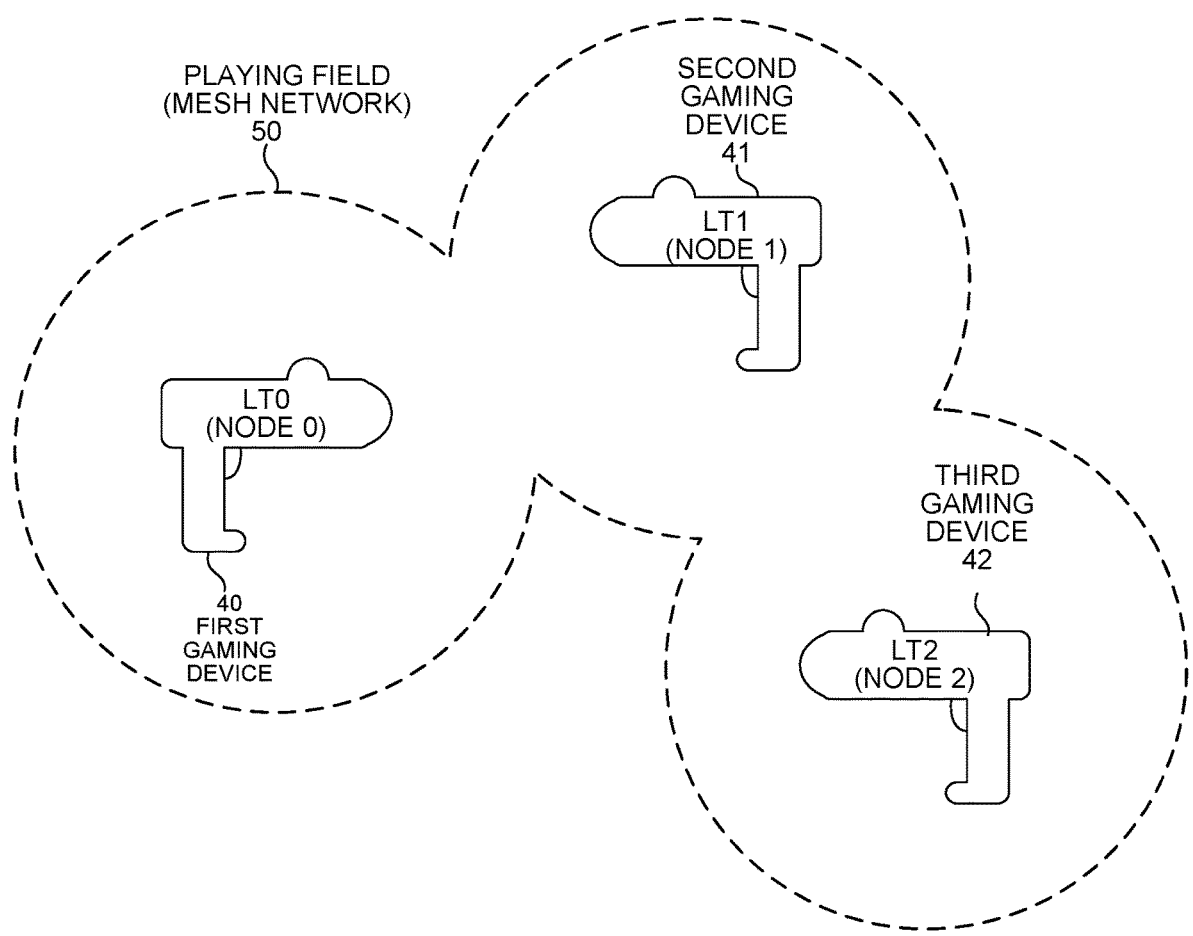
FIG. 4 is a diagram that shows a radio mesh network 50 formed by a plurality of gaming devices.

FIG. 4 is a diagram that shows a radio mesh network 50 formed by a plurality of gaming devices. The radio mesh network 50 determines a playing area of a game. The playing area of the game alters based in part on a location of the gaming devices. During game play, the playing area of the game changes as each of the gaming devices moves throughout the playing area. In the example of a laser tagging game, each player has a laser tagging device. For example, a first player uses the first gaming device 40, a second player uses the second gaming device 41, and a third player uses the third gaming device 42. During game play, the users will move as they aim to tag other players or to avoid being tagged by others. As the users move, the playing field will expand or contract in area. New users might be added to a game that might cause the playing field formed by the radio mesh network 50 to expand in area. Or, users might leave the game causing the playing field formed by the radio mesh network 50 to contract in area.

Figure 5:
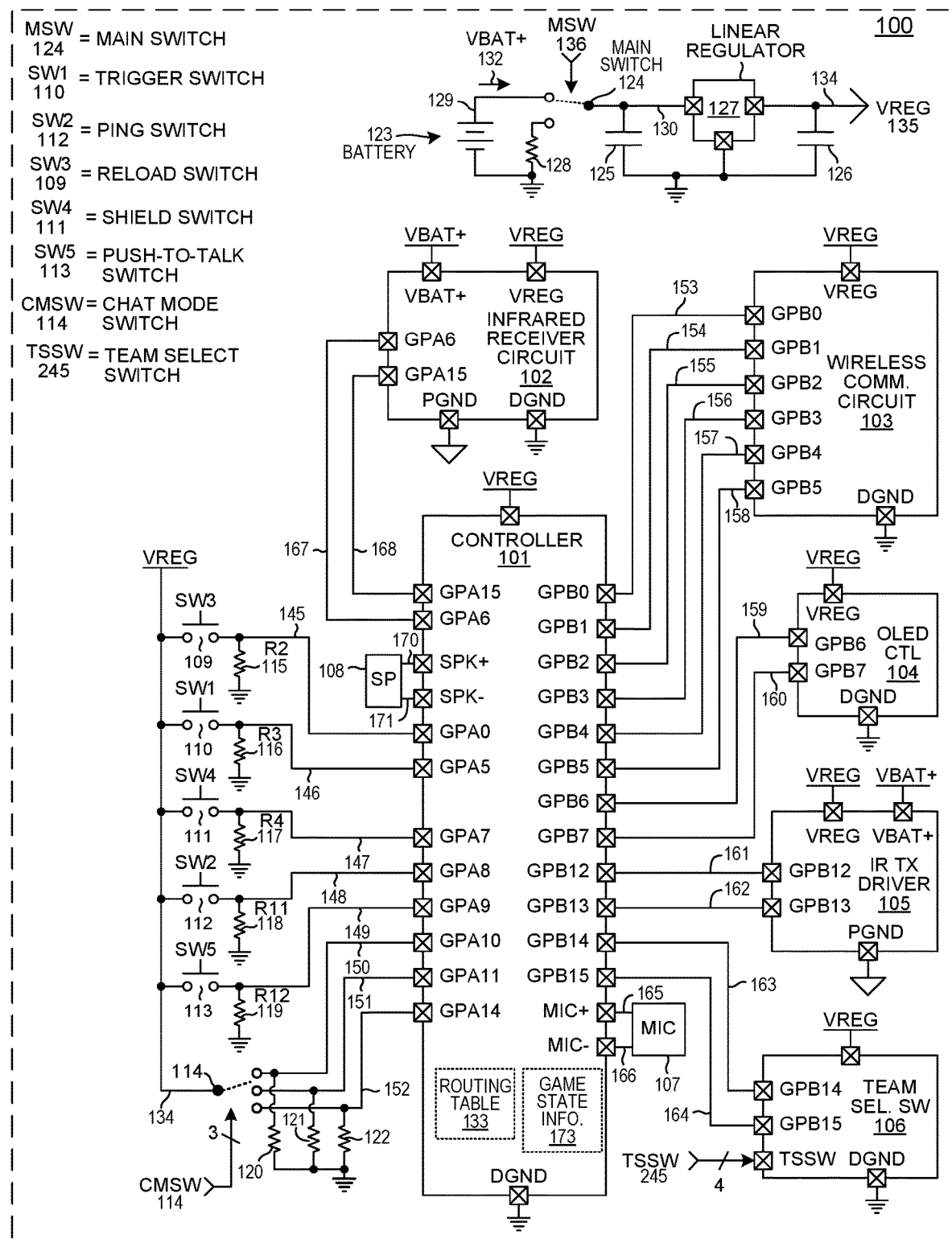
FIG. 5 is a circuit diagram of a gaming device 100 in accordance with one embodiment.

FIG. 5 is a circuit diagram of a gaming device 100 in accordance with one embodiment. The gaming device 100 comprises a controller 101, an infrared receiver circuit 102, a wireless communication circuit 103, a display controller 104, an infrared transmitter circuit 105, a team select switch circuit 106, a microphone 107, a speaker 108, a reload switch SW3 109, a trigger switch SW1 110, a shield switch SW4 111, a ping switch SW2 112, a push-to-talk switch SW5 113, a chat mode switch CMSW 114, resistors 115, 116, 117, 118, 119, 120, 121, 122, and 128, a battery 123, a main switch MSW 124, capacitors 125 and 126, and a linear regulator circuit 127. The controller 101 stores the routing table 133 and game state information 173.

The battery 123 outputs and supplies a battery voltage VBAT+ 132 onto a conductor 129. When the main switch 124 is enabled, the battery voltage VBAT+ 132 is supplied to the linear regulator circuit 127 via conductor 130. The linear regulator 127 receives the battery voltage VBAT+ 132 and outputs a regulated voltage VREG 135. The regulated voltage VREG 135 is supplied to VREG terminals of circuitry within the gaming device 100, including the controller 101, the infrared receiver circuit 102, the wireless communication circuit 103, the display controller 104, the infrared transmitter circuit 105, and the team select switch circuit 106.

Each of the switches controls various aspects of operation of the gaming device 100. These switches include the team select switch circuit 106, the reload switch SW3 109, the trigger switch SW1 110, the shield switch SW4 111, the ping switch SW2 112, the push-to-talk switch SW5 113, and the chat mode switch CMSW 114. When the reload switch SW3 109 is enabled, the regulated voltage VREG 135 is supplied to the GPA0 terminal of the controller 101 via conductor 145. The resistor 115 R2 is a pull-down resistor that transitions the signal on the GPA0 terminal to a digital logic low level when the reload switch SW3 109 is disabled. In this example, enabling the reload switch SW3 109 causes the controller 101 to enable a reload mode. In the reload mode, ammunition of the gaming device 100 is reloaded for use during game play.

When the trigger switch SW1 110 is enabled, the regulated voltage VREG 135 is supplied to the GPA5 terminal of the controller 101 via conductor 146. The resistor 116 R3 is a pull-down resistor that transitions the signal on the GPA5 terminal to a digital logic low level when the trigger switch SW1 110 is disabled. In this example, enabling the trigger switch SW1 110 causes the controller 101 to enable a trigger mode. In the trigger mode, the controller 101 controls the infrared transmitter circuit 105 to output an infrared communication. This is also referred to as "firing" or "tagging" with the gaming device 100 to tag or hit another gaming device during game play.

When the shield switch SW4 111 is enabled, the regulated voltage VREG 135 is supplied to the GPA7 terminal of the controller 101 via conductor 147. The resistor 117 R4 is a pull-down resistor that transitions the signal on the GPA7 terminal to a digital logic low level when the shield switch SW4 111 is disabled. In this example, enabling the shield switch SW4 111 causes the controller 101 to enable a shield mode. In the shield mode, the gaming device 100 cannot be tagged for a predetermined amount of time.

When the ping switch SW2 112 is enabled, the regulated voltage VREG 135 is supplied to the GPA8 terminal of the controller 101 via conductor 148. The resistor 118 R11 is a pull-down resistor that transitions the signal on the GPA8 terminal when the ping switch SW2 112 is disabled. In this example, enabling the ping switch SW2 112 causes the controller 101 to enable a ping mode. In the ping mode, the gaming device 100 pings another gaming device over the radio mesh network.

When the push-to-talk switch SW5 113 is enabled, the regulated voltage VREG 135 is supplied to the GPA9 terminal of the controller 101 via conductor 149. The resistor 119 R12 is a pull-down resistor that transitions the signal on the GPA9 terminal to a digital logic low level when the push-to-talk switch SW5 113 is disabled. In this example, enabling the push-to-talk switch SW5 113 causes the controller 101 to enable a push-to-talk mode. In the push-to-talk mode, the gaming device 100 sends audio communications to other gaming devices over the radio mesh network. This permits a player to communicate to a specific player, to a group of players, or to broadcast a message to everyone in the game.

The chat mode switch CMSW 114 is enabled in one of a plurality of selectable communication settings. In this example, the selectable communication settings include an all broadcast setting, a one-to-one communication setting, or a team communication setting (see FIG. 12). When the chat mode switch CMSW 114 is set to the broadcast setting, the regulated voltage VREG 135 is supplied to the GPA10 terminal of the controller 101 via conductor 150. The resistor 120 is a pull-down resistor that transitions the signal on the GPA10 terminal to a digital logic low level when the broadcast setting of the chat mode switch CMSW 114 is disabled. In this example, enabling the broadcast setting of the chat mode switch CMSW 114 causes the controller 101 to enable a broadcast communication mode. In the broadcast communication mode, the gaming device 100 sends audio communications to all other gaming devices over the radio mesh network. This permits a player to communicate to broadcast a message to everyone in the game.

When the chat mode switch CMSW 114 is set to the one-to-one communication setting, the regulated voltage VREG 135 is supplied to the GPA11 terminal of the controller 101 via conductor 151. The resistor 121 is a pull-down resistor that transitions the signal on the GPA11 terminal to a digital logic low level when the one-to-one communication setting of the chat mode switch CMSW 114 is disabled. In this example, enabling the one-to-one communication setting of the chat mode switch CMSW 114 causes the controller 101 to enable a one-to-one communication mode. In the one-to-one communication mode, the gaming device 100 sends audio communications to one of a selectable gaming device over the radio mesh network. This permits a player to communicate a message to a specific player in the game.

When the chat mode switch CMSW 114 is set to the team communication setting, the regulated voltage VREG 135 is supplied to the GPA14 terminal of the controller 101 via conductor 152. The resistor 122 is a pull-down resistor that transitions the signal on the GPA14 terminal to a digital logic low level when the team communication setting of the chat mode switch CMSW 114 is disabled. In this example, enabling the team communication setting of the chat mode switch CMSW 114 causes the controller 101 to enable a team communication mode. In the team communication mode, the gaming device 100 sends audio communications to all gaming devices in a particular team over the radio mesh network. This permits a player to communicate a message to all players on a particular team during game play.

The gaming device 100 communicates over the radio mesh network through wireless communication circuit 103. Controller 101 is communicatively connected to the wireless communication circuit 103 through a GPB0 terminal, a GPB1 terminal, a GPB2 terminal, a GPB3 terminal, a GPB4 terminal, and a GPB5 terminal. The GPB0 terminal of the controller 101 is coupled to a GPB0 terminal of the wireless communication circuit 103 via conductor 153. The GPB1 terminal of the controller 101 is coupled to a GPB1 terminal of the wireless communication circuit 103 via conductor 154. The GPB2 terminal of the controller 101 is coupled to a GPB2 terminal of the wireless communication circuit 103 via conductor 155. The GPB3 terminal of the controller 101 is coupled to a GPB3 terminal of the wireless communication circuit 103 via conductor 156. The GPB4 terminal of the controller 101 is coupled to a GPB4 terminal of the wireless communication circuit 103 via conductor 157. The GPB5 terminal of the controller 101 is coupled to a GPB5 terminal of the wireless communication circuit 103 via conductor 158.

The gaming device 100 outputs visual output onto a display. The controller 101 is coupled to the display controller 104 through a GPB6 terminal and a GPB7 terminal. The GPB6 terminal of the controller 101 is coupled to a GPB6 terminal of the display controller 104 via conductor 159. The GPB7 terminal of the controller 101 is coupled to a GPB7 terminal of the display controller 104 via conductor 160. In one example, the display controller 104 is an organic light-emitting diode (OLED) display controller.

The gaming device outputs infrared signals to be detected by other gaming devices. The controller 101 outputs the infrared signals through the infrared transmitter circuit 105. The controller 101 is communicatively coupled to the infrared transmitter circuit 105 through a terminal GPB12 and a terminal GPB13. The GPB12 terminal of the controller 101 is coupled to a GPB12 terminal of the infrared transmitter circuit 105 via conductor 161. The GPB13 terminal of the controller 101 is coupled to a GPB13 terminal of the infrared transmitter circuit 105 via conductor 162.

The gaming device receives infrared signals output by other gaming devices. The controller 101 receives the infrared signals through the infrared receiver circuit 102. The controller 101 is communicatively coupled to the infrared receiver circuit 102 through a terminal GPA6 and a terminal GPA15. The GPA6 terminal of the controller 101 is coupled to a GPA6 terminal of the infrared receiver circuit 102 via conductor 167. The GPA15 terminal of the controller 101 is coupled to a GPA15 terminal of the infrared receiver circuit 102 via conductor 168.

The gaming device 100 includes audio input and audio output that allows users/players to communicate with each other over the radio mesh network. The gaming device 100 receives audio input signals through the microphone 107. The microphone 107 is coupled to a MIC+ terminal via conductor 165 and a MIC− terminal via conductor 166. The gaming device 100 generates audio output signals through the speaker 108. The speaker 108 is coupled to a SPK+ terminal via conductor 170 and a SPK− terminal via conductor 171. Players communicate through the gaming devices over the radio mesh network using auditory input and output.

A player configures a game through the gaming device 100 using the team select switch circuit 106. No outside device other than the gaming device 100 is involved in configuring a game. No mobile phone, central host system, or external device is used to configure the game. The user/player is able to configure the game entirely through the gaming device 100. In this embodiment, the team select switch circuit 106 includes four optional game configuration settings. The game configuration settings include a host game setting, a solo game setting, a team one game setting, or a team two game setting. A player configures a game by selecting a desired game configuration setting. The controller 101 is communicatively coupled to the team select switch circuit 106 through a terminal GPB14 and a terminal GPB15. The GPB14 terminal of the controller 101 is coupled to a GPB14 terminal of the team select switch circuit 106 via conductor 163. The GPB15 terminal of the controller 101 is coupled to a GPB15 terminal of the team select switch circuit 106 via conductor 164.

Figure 6:
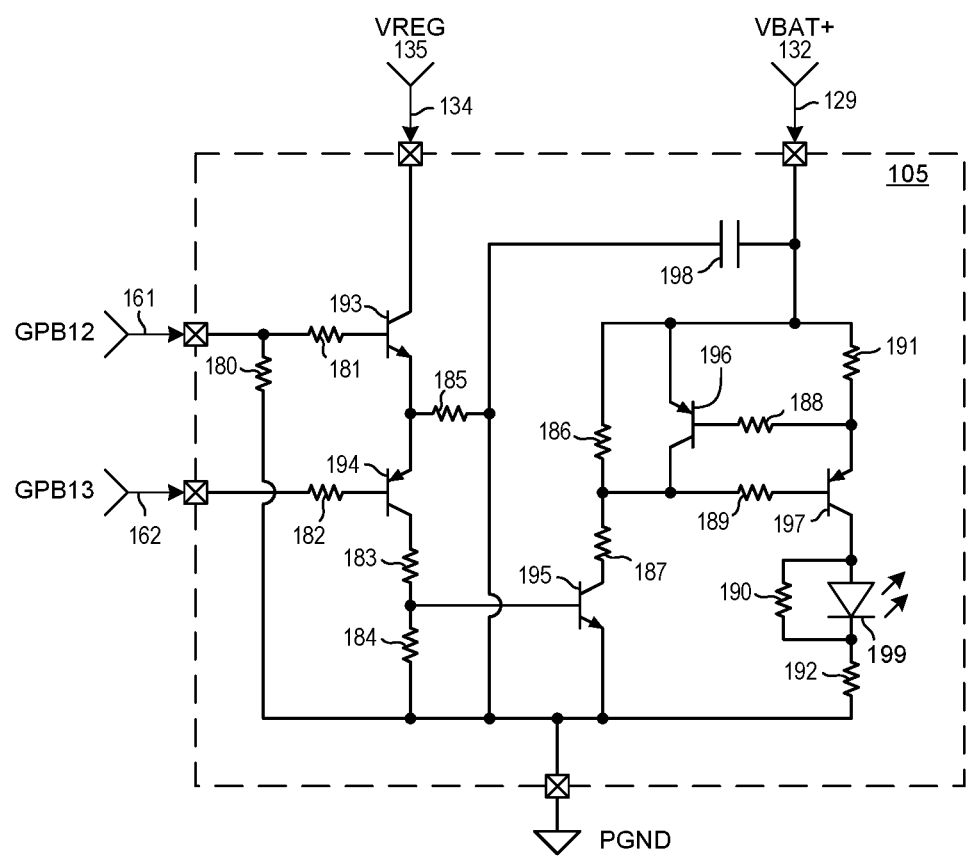
FIG. 6 is a detailed circuit diagram of the infrared transmitter circuit 105.

FIG. 6 is a detailed circuit diagram of the infrared transmitter circuit 105. The infrared transmitter circuit 105 comprises resistors 180-192, transistors 193-197, a capacitor 198, and an infrared output device 199. A terminal of transistor 193 is coupled to receive the regulated voltage VREG 135 on conductor 134 via a VREG terminal. A gate of transistor 193 is resistively coupled via resistor 181 to GPB12 terminal of the controller 101 via the conductor 161. A gate of transistor 194 is resistively coupled via resistor 182 to the GPB13 terminal of controller 101 via the conductor 162. The infrared transmitter circuit 105 generates and outputs infrared signals via the infrared output device 199.

Figure 7:
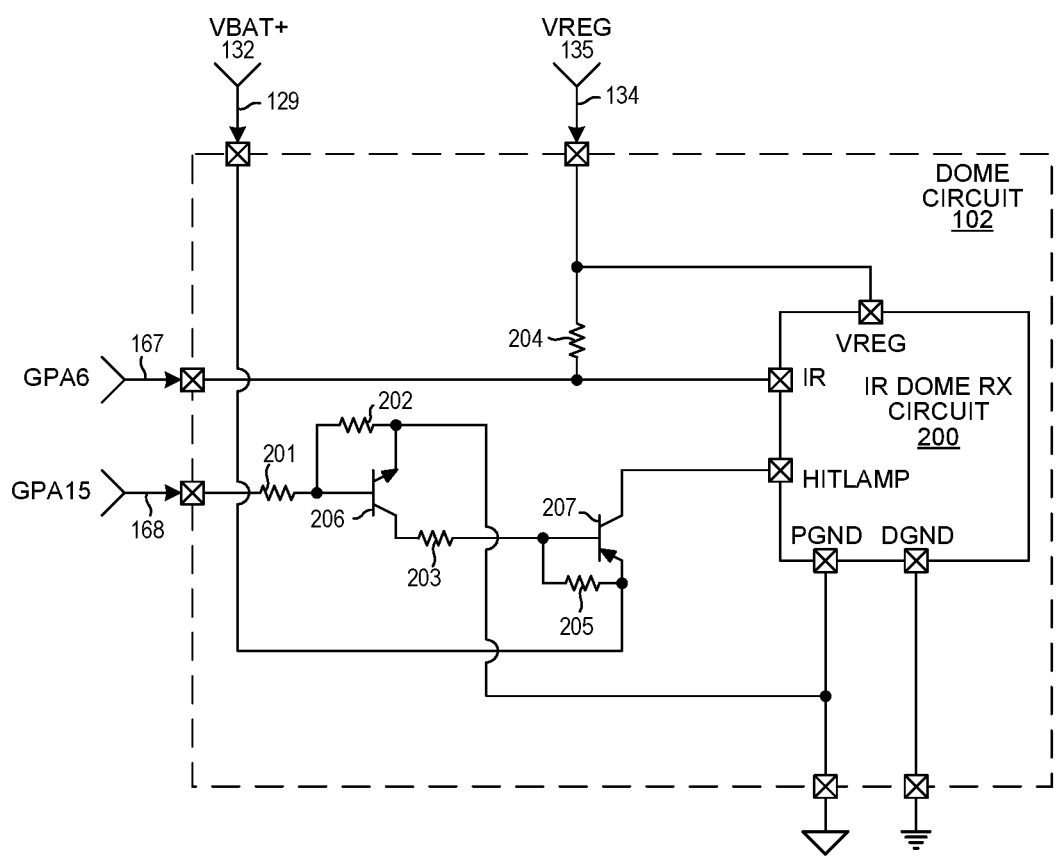
FIG. 7 is a detailed circuit diagram of the infrared receiver circuit 102.

FIG. 7 is a detailed circuit diagram of the infrared receiver circuit 102. The infrared receiver circuit 102 comprises an infrared dome receiver 200, resistors 201-205, and transistors 206 and 207. The infrared dome receiver circuit 200 includes an IR terminal coupled to the GPA6 terminal of controller 101 through conductor 167. The infrared dome receiver circuit 200 includes a HITLAMP terminal coupled to a terminal of the transistor 207. A gate of transistor 206 is resistively coupled via resistor 201 to the GPA15 terminal of controller 101 through conductor 168. The infrared dome receiver circuit 200 includes a VREG terminal coupled to receive the regulated voltage VREG 135 via conductor 134.

Figure 8:
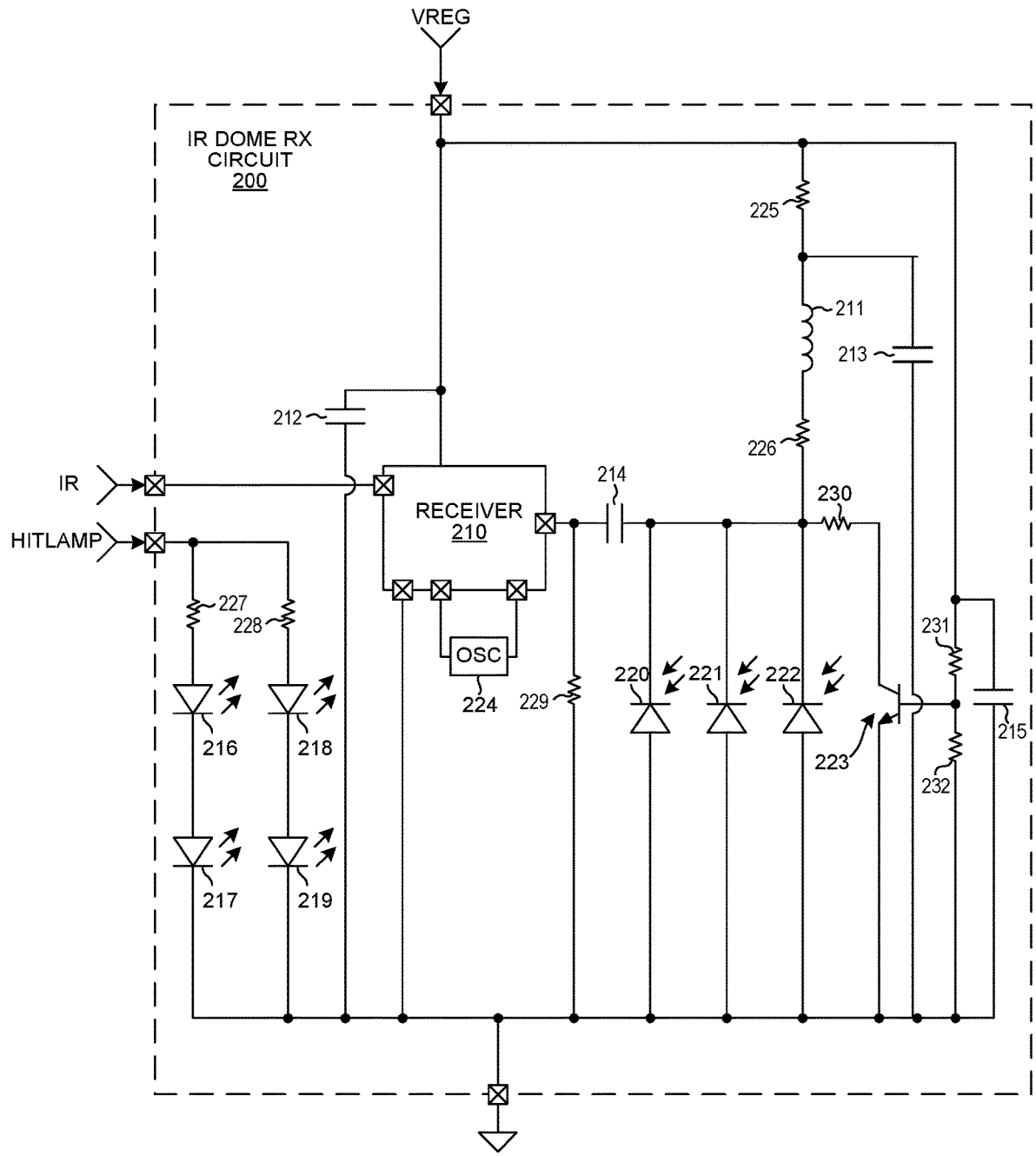
FIG. 8 is a detailed circuit diagram of the infrared dome receiver circuit 200.

FIG. 8 is a detailed circuit diagram of the infrared dome receiver circuit 200. The infrared dome receiver circuit 200 is part of the infrared receiver circuit 102 shown in FIG. 7. The infrared dome receiver circuit 200 comprises a receiver circuit 210, inductor 211, capacitors 212-215, optical output devices 216-219, optical input devices 220-222, a transistor 223, an oscillator 224, and resistors 225-232.

Figure 9:
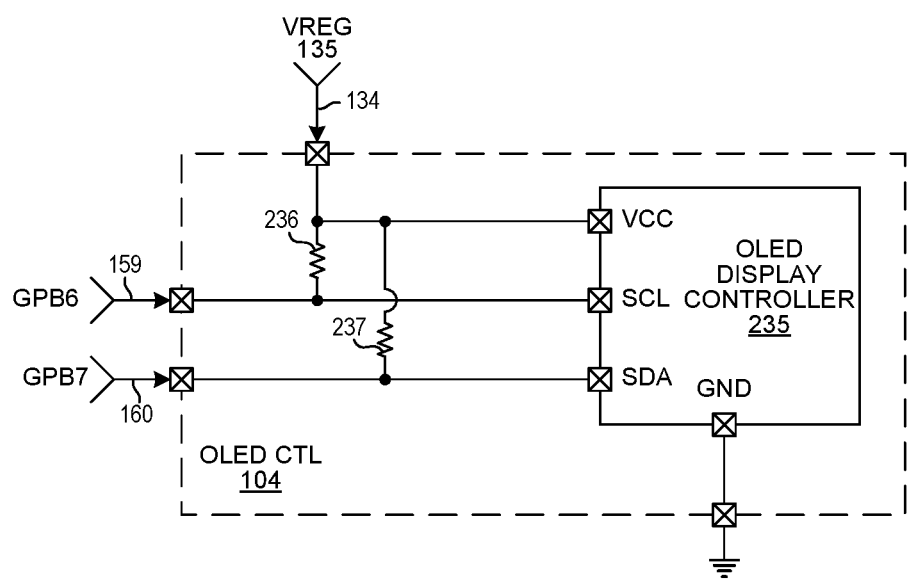
FIG. 9 is a detailed circuit diagram of the display controller 104.

FIG. 9 is a detailed circuit diagram of the display controller 104. The display controller 104 includes an OLED display controller circuit 235 and resistors 236 and 237. The OLED display controller circuit 235 includes a VCC terminal, a SCL terminal, an SDA terminal, and a GND terminal. The VCC terminal of the OLED display controller circuit 235 receives the regulated voltage VREG 135 via conductor 134. The SCL terminal of the OLED display controller circuit 235 is coupled to the GPB6 terminal of the controller 101 through conductor 159. The SDA terminal of the OLED display controller circuit 235 is coupled to the GPB7 terminal of the controller 101 through conductor 160.

Figure 10:
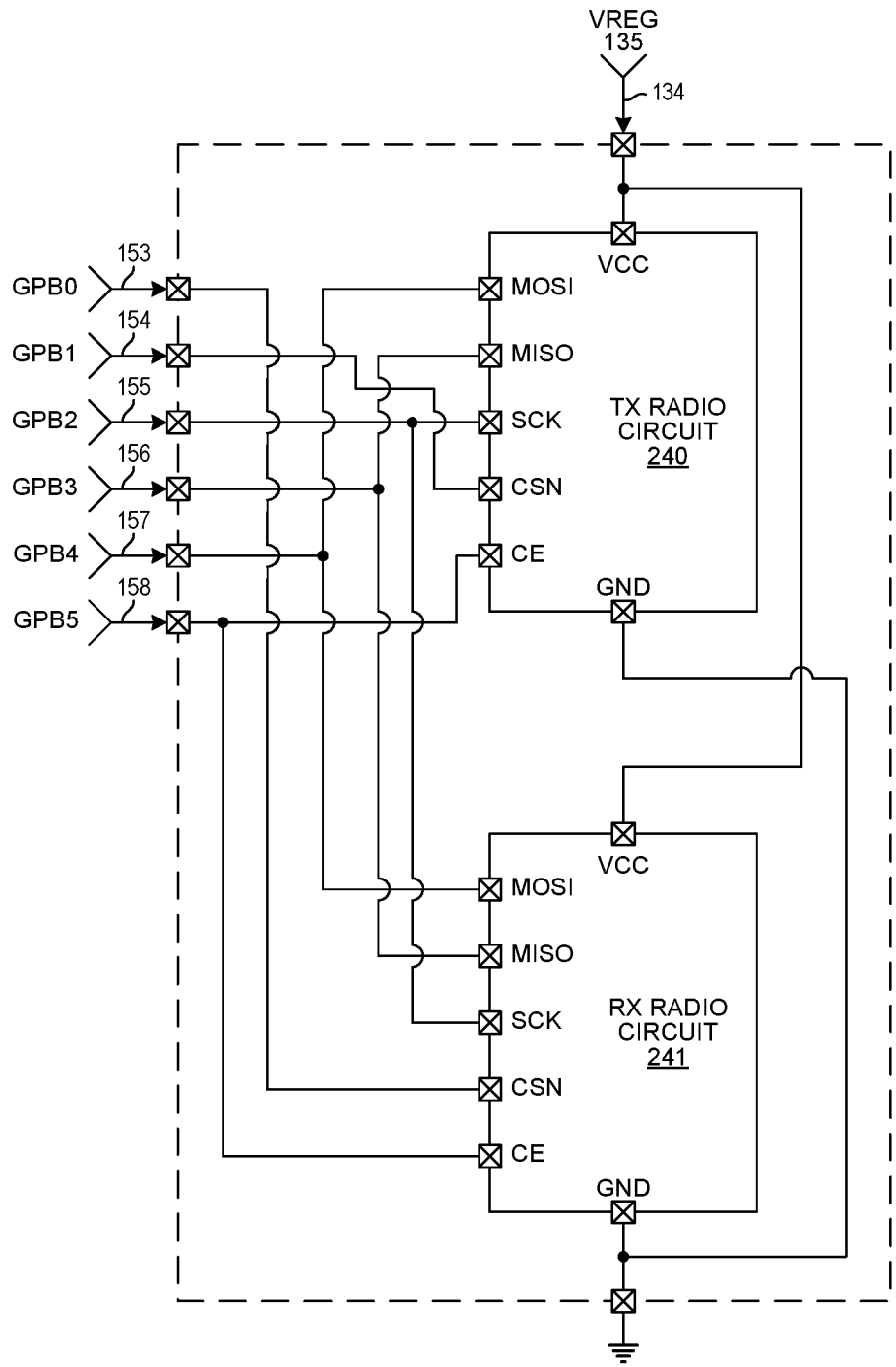
FIG. 10 is a detailed circuit diagram of the wireless communication circuit 103.

FIG. 10 is a detailed circuit diagram of the wireless communication circuit 103. The wireless communication circuit 103 includes a transmitter radio circuit 240 and a receiver radio circuit 241. Each of the transmitter radio circuit 240 and the receiver radio circuit 241 includes a VCC terminal, a MOSI terminal, a MISO terminal, a SCK terminal, a CSN terminal, a CE terminal, and a GND terminal. The VCC terminals of the transmitter radio circuit 240 and the receiver radio circuit 241 are coupled to receive the regulated voltage VREG 135 via conductor 134. The MOSI terminals of the transmitter radio circuit 240 and the receiver radio circuit 241 are coupled to the GPB4 terminal of the controller 101 via conductor 157. The MISO terminals of the transmitter radio circuit 240 and the receiver radio circuit 241 are coupled to the GPB3 terminal of the controller 101 via conductor 156. The SCK terminals of the transmitter radio circuit 240 and the receiver radio circuit 241 are coupled to the GPB2 terminal of the controller 101 via conductor 155. The CSN terminal of the transmitter radio circuit 240 is coupled to the GPB1 terminal of the controller 101 via conductor 154. The CSN terminal of the receiver radio circuit 241 is coupled to the GPB0 terminal of the controller 101 via conductor 153. The CE terminals of the transmitter radio circuit 240 and the receiver radio circuit 241 are coupled to the GPB5 terminal of the controller 101 via conductor 158.

Figure 11:
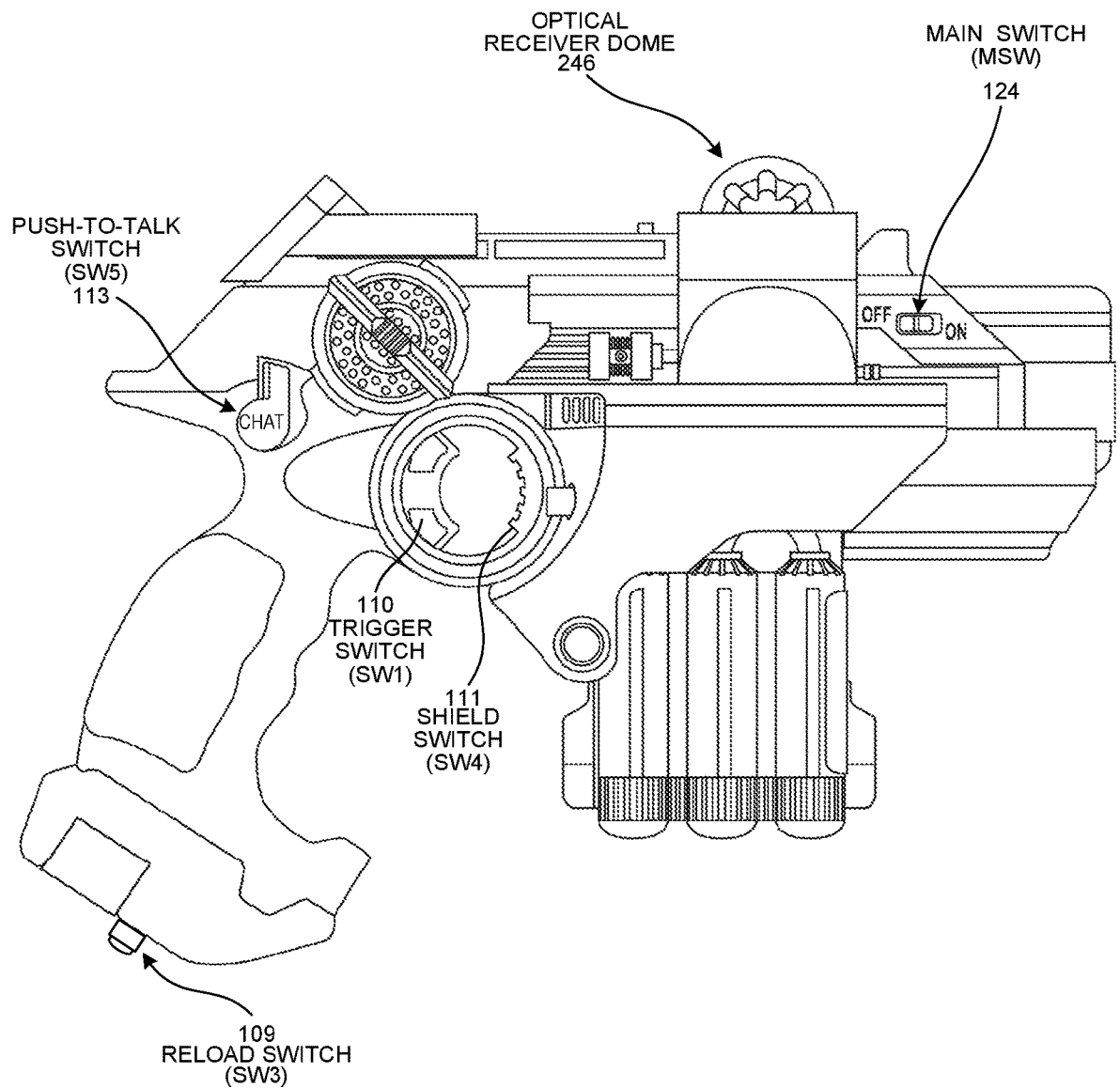
FIG. 11 is a diagram showing a right-side view of the gaming device 100.

FIG. 11 is a diagram showing a right-side view of the gaming device 100. This view shows the main switch MSW 124, the reload switch SW3 109, the trigger switch SW1 110, the shield switch SW4 111, and the push-to-talk switch SW5 113. A user/player switches the gaming device 100 ON or OFF through the main switch MSW 124. The user/player enables a reload mode through the reload switch SW3 109. In the reload mode, ammunition of the gaming device 100 is reloaded for use during game play. The user/player enables the trigger mode through the trigger switch SW1 110. In the trigger mode, the gaming device 100 outputs an infrared communication thereby tagging another gaming device. The user/player enables the shield mode through the shield switch SW4 111. In the shield mode, the gaming device 100 cannot be tagged for a predetermined amount of time. The user/player enables the push-to-talk mode through the push-to-talk switch SW5 113. In the push-to-talk mode, the gaming device 100 sends audio communications to other gaming devices over the radio mesh network thereby enabling player-to-player communication.

Figure 12:
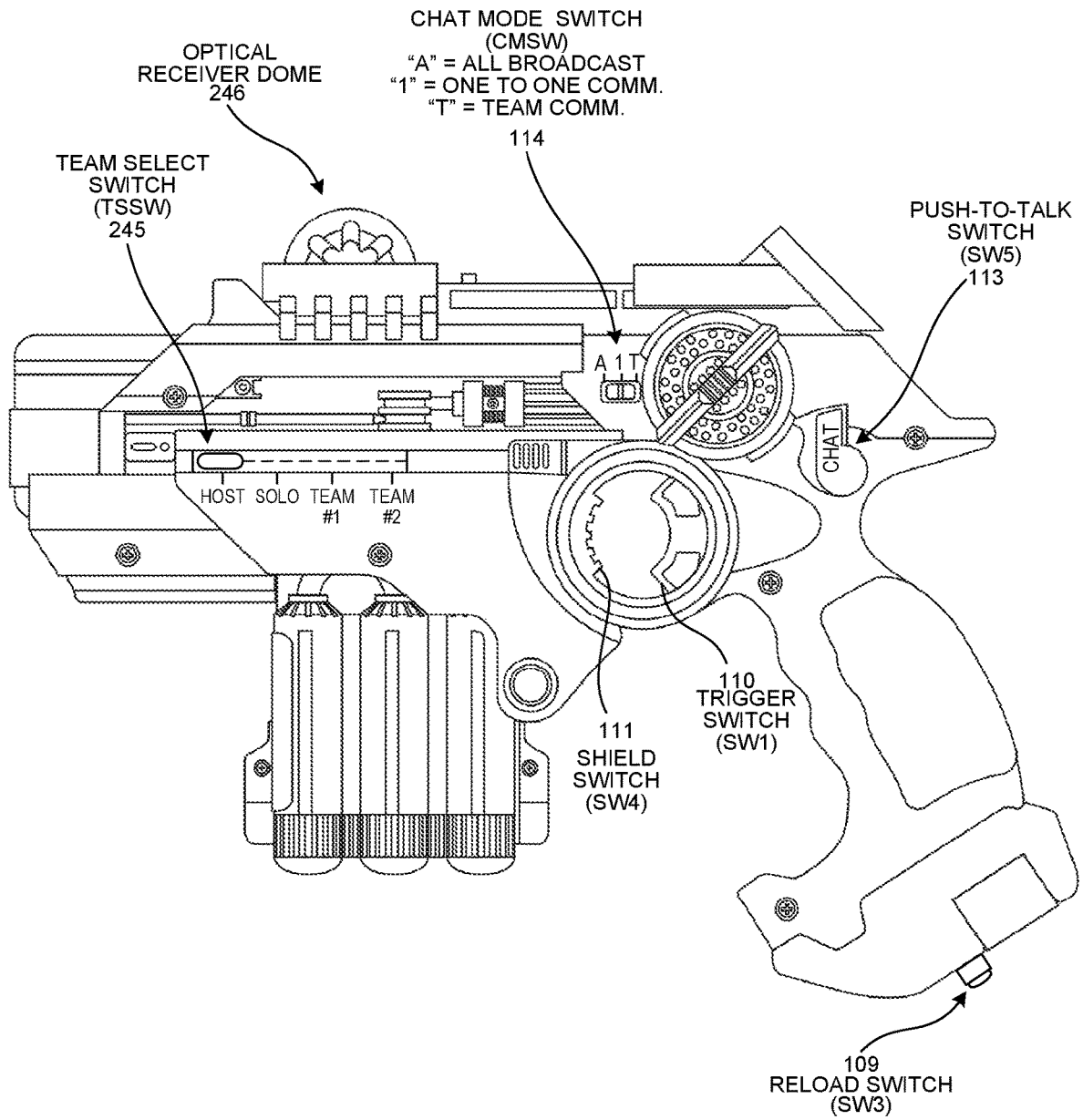
FIG. 12 is a diagram showing a left-side view of the gaming device 100.

FIG. 12 is a diagram showing a left-side view of the gaming device 100. This view shows the chat mode switch CMSW 114 and the team select switch TSSW 245. The user/player selects one of the selectable communication settings through the chat mode switch CMSW 114. The user/player configures a game through the team select switch TSSW 245.

Figure 13:
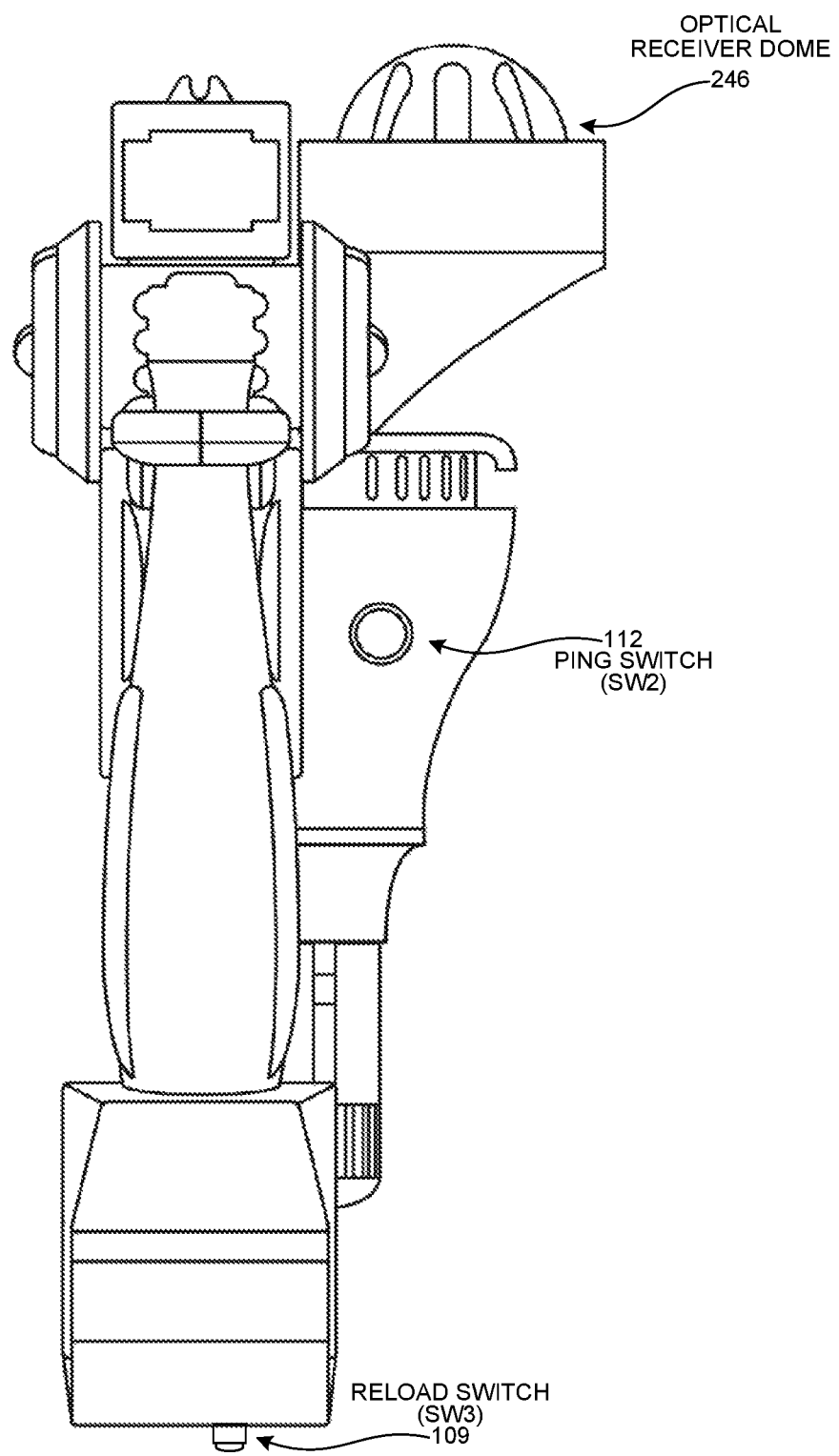
FIG. 13 is a diagram showing a rear view of the gaming device 100.

FIG. 13 is a diagram showing a rear view of the gaming device 100. This view shows the ping switch SW2 112. The user/player enables the ping mode through the ping switch SW2 112. In the ping mode, the user/player pings another player through the gaming device 100 over the radio mesh network.

Figure 14:
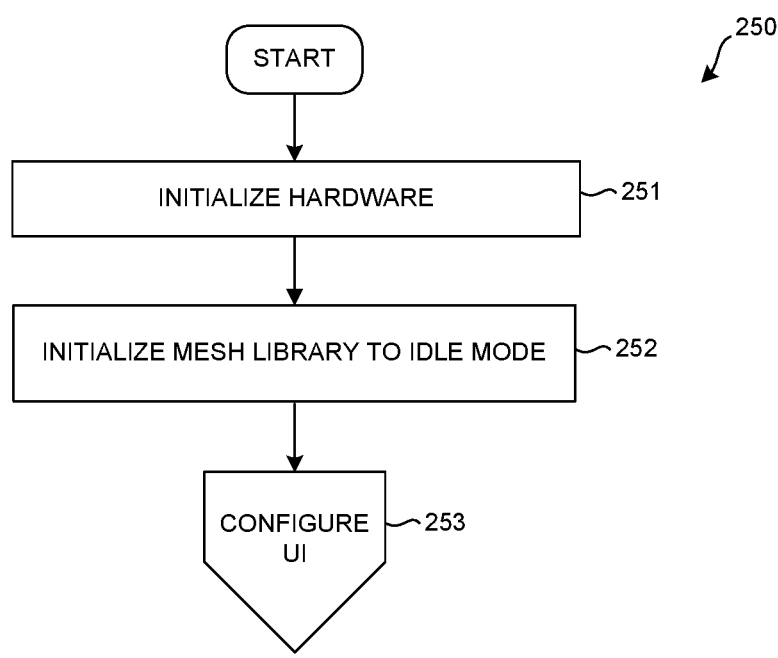
FIG. 14 is a flowchart of a method 250.

FIG. 14 is a flowchart of a method 250. The method 250 is an initialization method. At block 251, hardware of the gaming device 100 is initialized. Next, at block 252, a mesh library of the gaming device 100 is initialized. Next, at block 253, a user interface of the gaming device 100 is configured.

Figure 15:
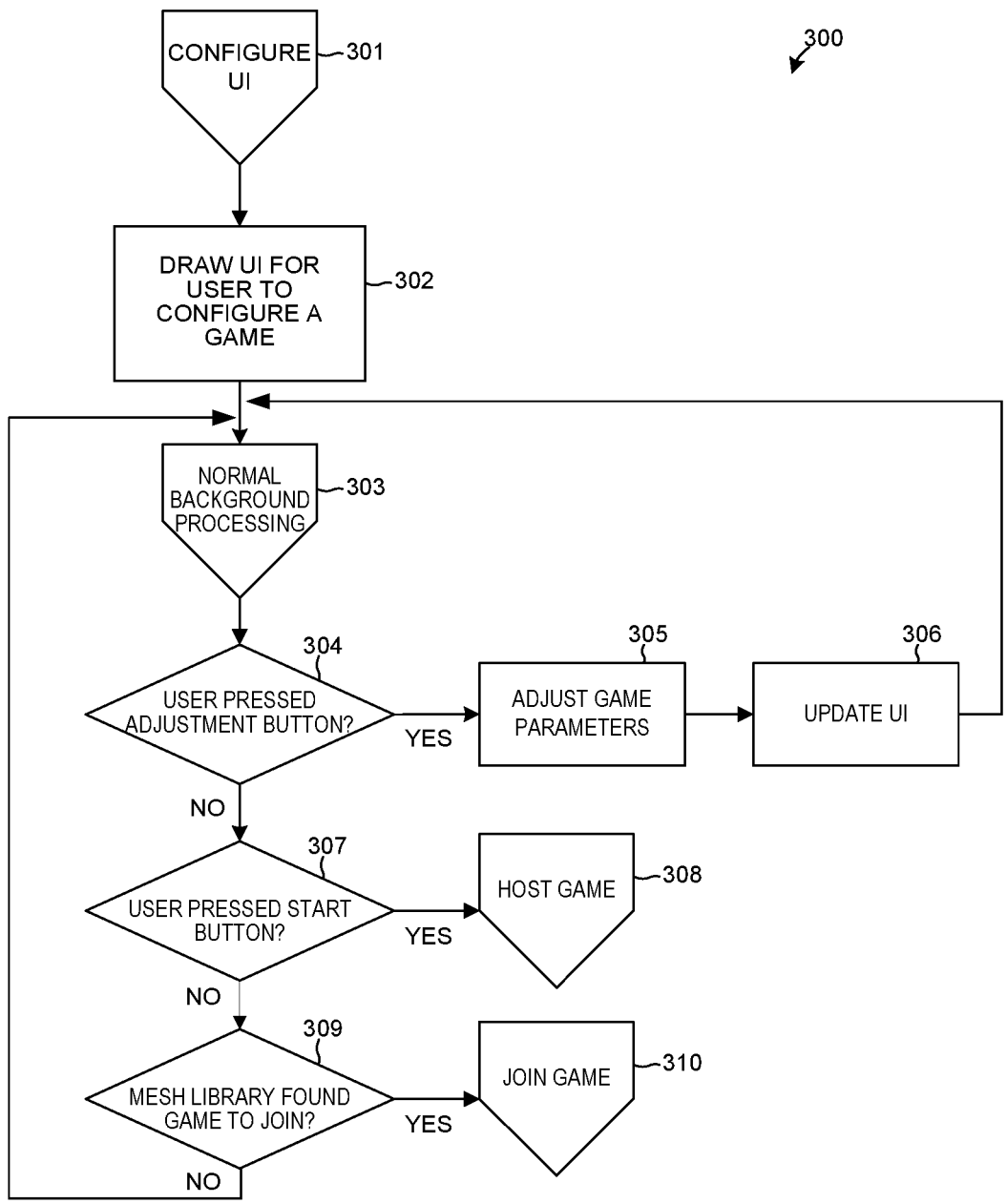
FIG. 15 is a flowchart of a method 300.

FIG. 15 is a flowchart of a method 300. The method 300 is a method of configuring the user interface of the gaming device 100. At block 301, the configuration of the user interface is initiated. At block 302, a user interface is drawn on a display of the gaming device 100 to configure a game. At block 303, normal background processing is initiated. At block 304, a determination is made as to whether an adjustment button on the gaming device 100 has been pressed. If it is determined at block 304 that the adjustment button press was pressed, then the method proceeds to block 305 in which game parameters are adjusted, next to block 306 in which the user interface is updated on the display, and next returns to normal background processing at block 303. If, on the other hand, it is determined at block 304 that the adjustment button press was not pressed, then the method proceeds to block 307.

At block 307, a determination is made as to whether a start button on the gaming device 100 has been pressed. If it is determined at block 307 that the start button press was pressed, then the method proceeds to block 308 in which the user configures a game to host at block 308. If, on the other hand, it is determined at block 307 that the start button press was not pressed, then the method proceeds to block 309.

At block 309, a determination is made as to whether the mesh library initialized on the gaming device 100 has identified a game to join. If it is determined at block 309 that the mesh library has identified a game to join, then the method proceeds to join the game at block 310. If, on the other hand, it is determined at block 309 that the mesh library has not identified a game to join, then the method proceeds to return to normal background processing at block 303.

Figure 16A:
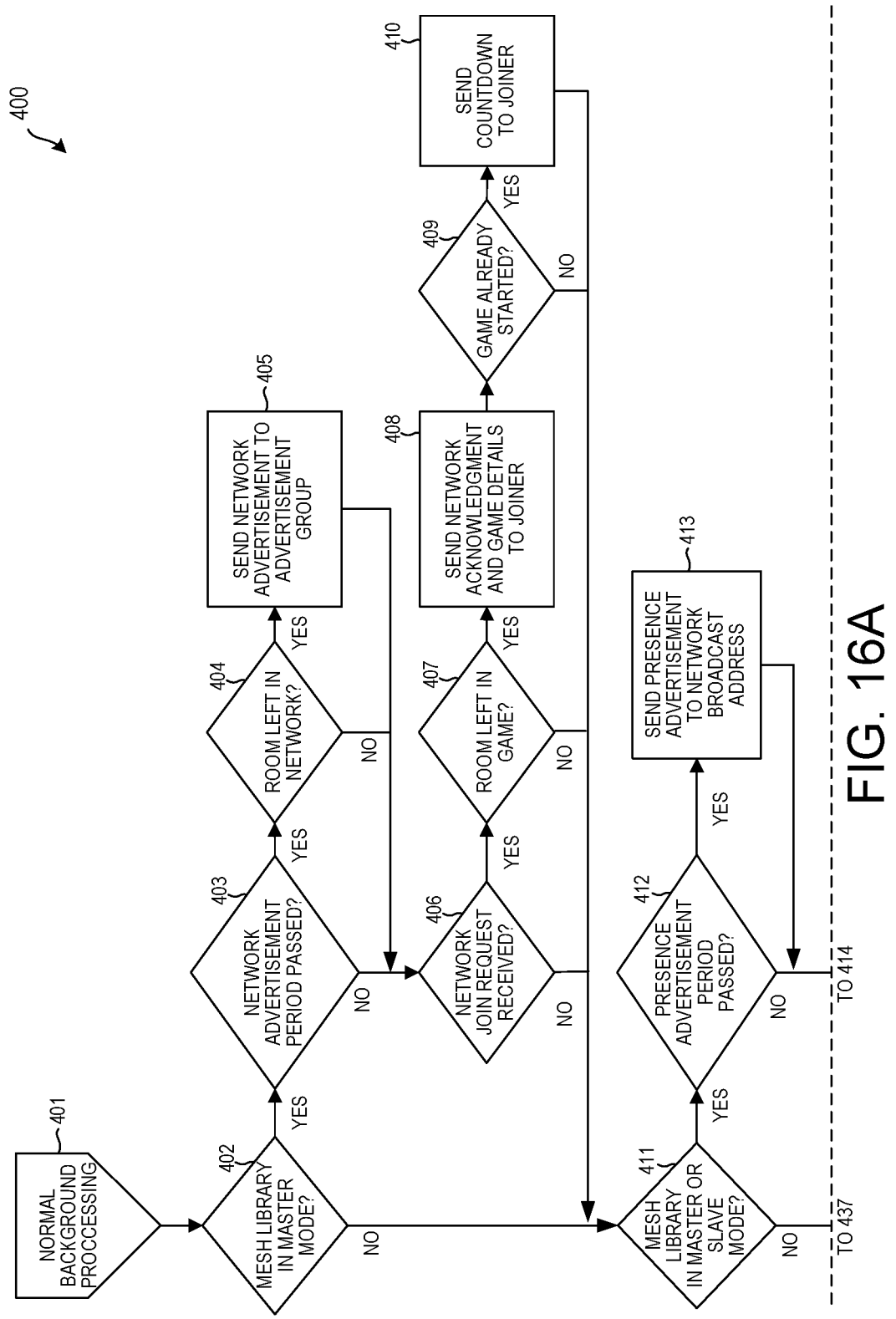
FIG. 16A, FIG. 16B, and FIG. 16C, which together form
Figure 16B:
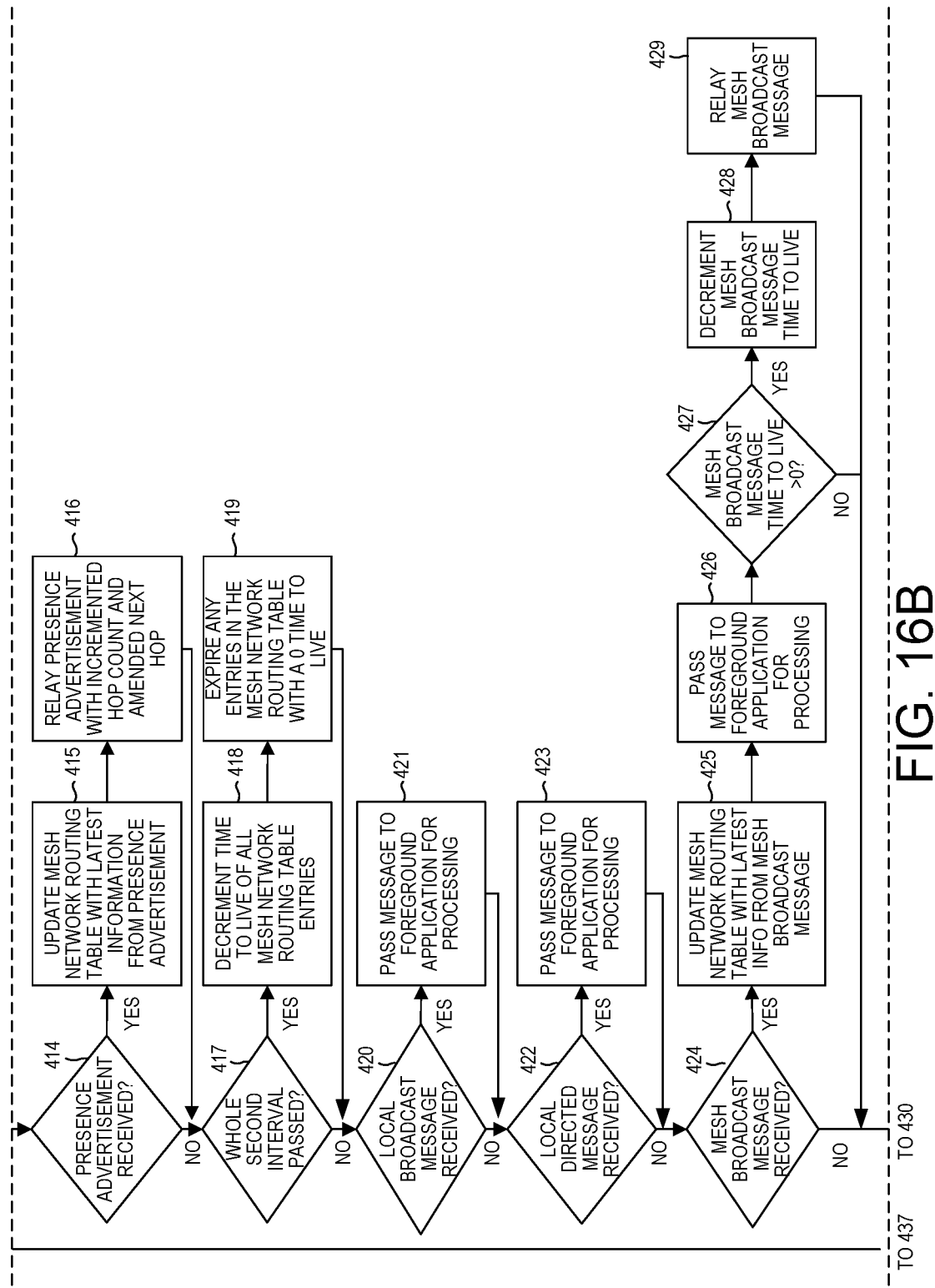
Figure 16C:
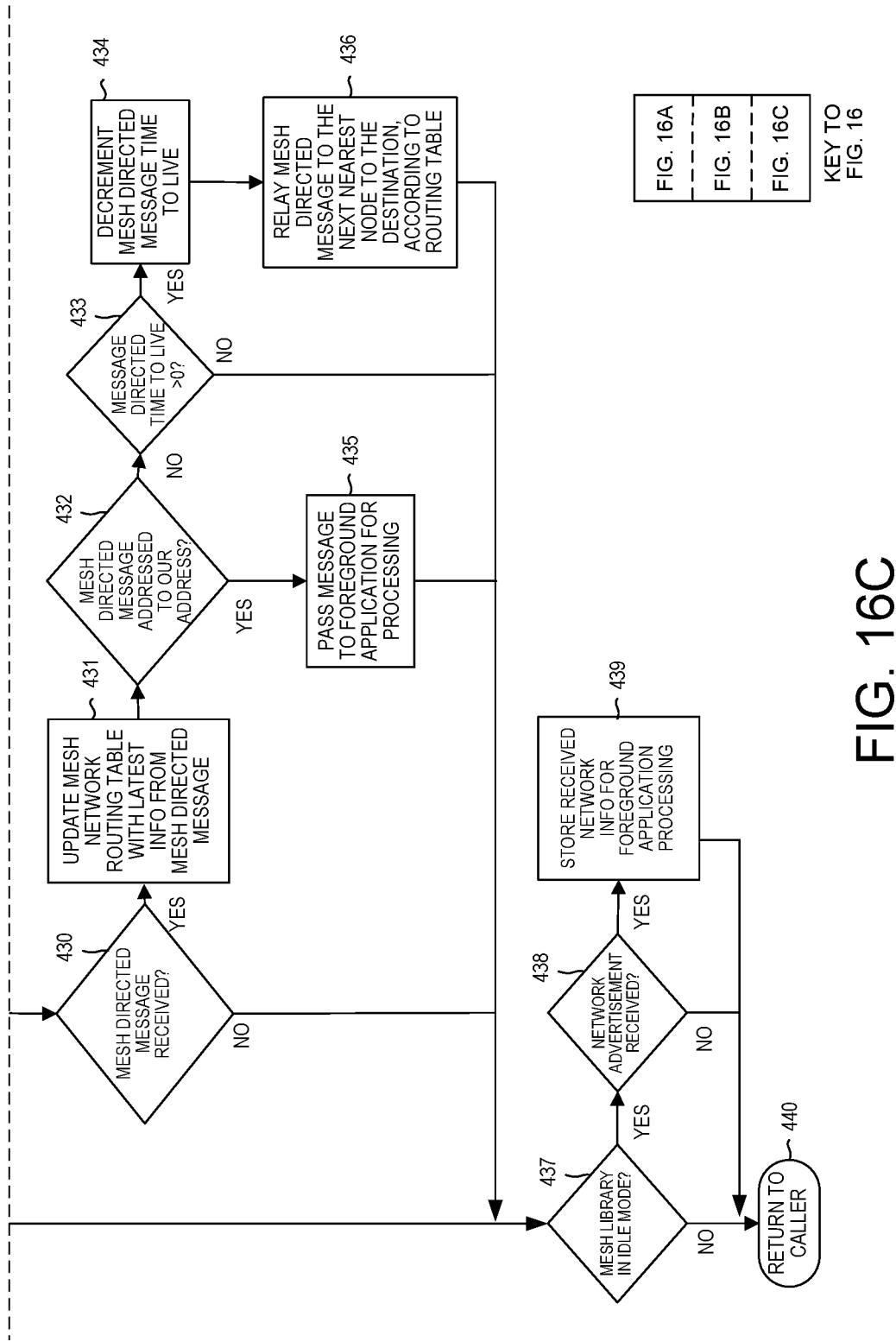

FIG. 16A, FIG. 16B, and FIG. 16C, which together form FIG. 16, are a flowchart of a method 400. At block 401, normal background processing is initiated. At block 402, a determination is made as to whether the mesh library is in a master mode. If it is determined at block 402 that the mesh library is in a master mode, then the method proceeds to block 403. If, on the other hand, it is determined at block 402 that the mesh library is not in the master mode, then the method proceeds to block 411.

At block 403, a determination is made as to whether a network advertisement period has passed. If it is determined at block 403 that the network advertisement period has passed, then the method proceeds to block 404. If, on the other hand, it is determined at block 403 that the network advertisement period has not passed, then the method proceeds to block 406.

At block 404, a determination is made as to whether room is left in the network. If it is determined at block 404 that room is available in the network, then the method proceeds to block 405. If, on the other hand, it is determined at block 404 that no room is available in the network, then the method proceeds to block 405. At block 405, a network advertisement is sent to an advertisement group. Next, the method proceeds to block 406.

At block 406, a determination is made as to whether a network join request was received. If it is determined at block 406 that a network join request was received, then the method proceeds to block 407. If, on the other hand, it is determined at block 406 that no network join request was received, then the method proceeds to block 411.

At block 407, a determination is made as to whether room is left in the game for additional players. If it is determined at block 407 that room is left in the game, then the method proceeds to block 408. If, on the other hand, it is determined at block 407 that no room is left in the game, then the method proceeds to block 411. At block 408, a network acknowledgement and game details are sent to the player joining the game.

At block 409, a determination is made as to whether the game has already started. If it is determined at block 407 that the game has already started, then the method proceeds to block 410. At block 410, a countdown is sent to the player joining the game and the method proceeds to block 411. If, on the other hand, it is determined at block 409 that no room is left in the game, then the method proceeds to block 411.

At block 411, a determination is made as to whether the mesh library is in a master mode or slave mode. If it is determined at block 411 that the mesh library is in the master mode or slave mode, then the method proceeds to block 412. If, on the other hand, it is determined at block 411 that the mesh library is not in the master mode or slave mode, then the method proceeds to block 437.

At block 412, a determination is made as to whether the presence advertisement period has passed. If it is determined at block 412 that the presence advertisement period has passed, then the method proceeds to block 413. At block 413, a presence advertisement is sent to a network broadcast address. If, on the other hand, it is determined at block 412 that the presence advertisement period has not passed, then the method proceeds to block 414.

At block 414, a determination is made as to whether a presence advertisement was received. If it is determined at block 414 that a presence advertisement was received, then the method proceeds to block 415. At block 415, mesh network routing table is updated with latest information from presence advertisement. Next, at block 416, presence advertisement is relayed with an incremented hop count and with an amended next hop. Next, the method proceeds to block 417. If, on the other hand, it is determined at block 414 that no presence advertisement was received, then the method proceeds to block 417.

At block 417, a determination is made as to whether a whole second interval has passed. If it is determined at block 417 that a whole second interval has passed, then the method proceeds to block 418. At block 418, time to live information is decremented for all mesh network routing table entries. Next, at block 419, any entries in the mesh network routing table with a time to live of zero or null are expired. Next, the method proceeds to block 420. If, on the other hand, it is determined at block 417 that no presence advertisement was received, then the method proceeds to block 420.

At block 420, a determination is made as to whether a local broadcast message was received. If it is determined at block 420 that a local broadcast message was received, then the method proceeds to block 421. At block 421, the local broadcast message is passed to a foreground application for processing. Next, the method proceeds to block 422. If, on the other hand, it is determined at block 420 that no local broadcast message was received, then the method proceeds to block 422.

At block 422, a determination is made as to whether a local directed message was received. If it is determined at block 422 that a local directed message was received, then the method proceeds to block 423. At block 423, the local directed message is passed to a foreground application for processing. Next, the method proceeds to block 424. If, on the other hand, it is determined at block 422 that no local directed message was received, then the method proceeds to block 424.

At block 424, a determination is made as to whether a mesh broadcast message was received. If it is determined at block 424 a mesh broadcast message was received, then the method proceeds to block 425. If, on the other hand, it is determined at block 424 that no mesh broadcast message was received, then the method proceeds to block 430. At block 425, the mesh network routing table is updated with latest information received from the mesh broadcast message. Next, at block 426, the mesh broadcast message is passed to a foreground application for processing. Next, at block 427, a determination is made as to whether the mesh broadcast message has a time to live greater than zero. If it is determined at block 427 that the mesh broadcast message has a time to live greater than zero, then the method proceeds to decrement the mesh broadcast time to live at block 428, to relay the mesh broadcast message at block 429, and to block 430. If, on the other hand, it is determined at block 427 that the mesh broadcast message does not have a time to live greater than zero, then the method proceeds to block 430.

At block 430, a determination is made as to whether a mesh directed message was received. If it is determined at block 430 that a mesh directed message was received, then the method proceeds to block 431. If, on the other hand, it is determined at block 430 that no mesh directed message was received, then the method proceeds to block 437. At block 431, the mesh network routing table is updated with latest information received from the mesh directed message.

Next, at block 432, a determination is made as to whether the mesh directed message is addressed to the address of this gaming device. If it is determined at block 432 that the mesh directed message is addressed to the address of this gaming device, then the method proceeds to block 433. If, on the other hand, it is determined at block 432 that mesh directed message is not addressed to the address of this gaming device, then the method proceeds to block 435. At block 435, the mesh directed message is passed to a foreground application for processing. Next, the method proceeds to block 437.

At block 433, a determination is made as to whether the time to live of the mesh directed message is greater than zero. If it is determined at block 433 that the time to live of the mesh directed message is greater than zero, then the method proceeds to block 434. If, on the other hand, it is determined at block 433 that the time to live of the mesh directed message is not greater than zero, then the method proceeds to block 437. At block 434, the time to live of the mesh directed message is decremented. Next, at block 436, the mesh directed message is relayed to the next nearest node to the destination in accordance with the stored routing table. Next, the method proceeds to block 437.

At block 437, a determination is made as to whether the mesh library is in an idle mode. If it is determined at block 437 that the mesh library is in the idle mode, then the method proceeds to block 438. If, on the other hand, it is determined at block 437 that the mesh library is not in the idle mode, then the method proceeds to block 440. At block 438, a determination is made as to whether a network advertisement was received. If it is determined at block 438 that a network advertisement was received, then the method proceeds to block 439. If, on the other hand, it is determined at block 438 that no network advertisement was received, then the method proceeds to block 440. At block 440, a return to caller operation is performed.

Figure 17:
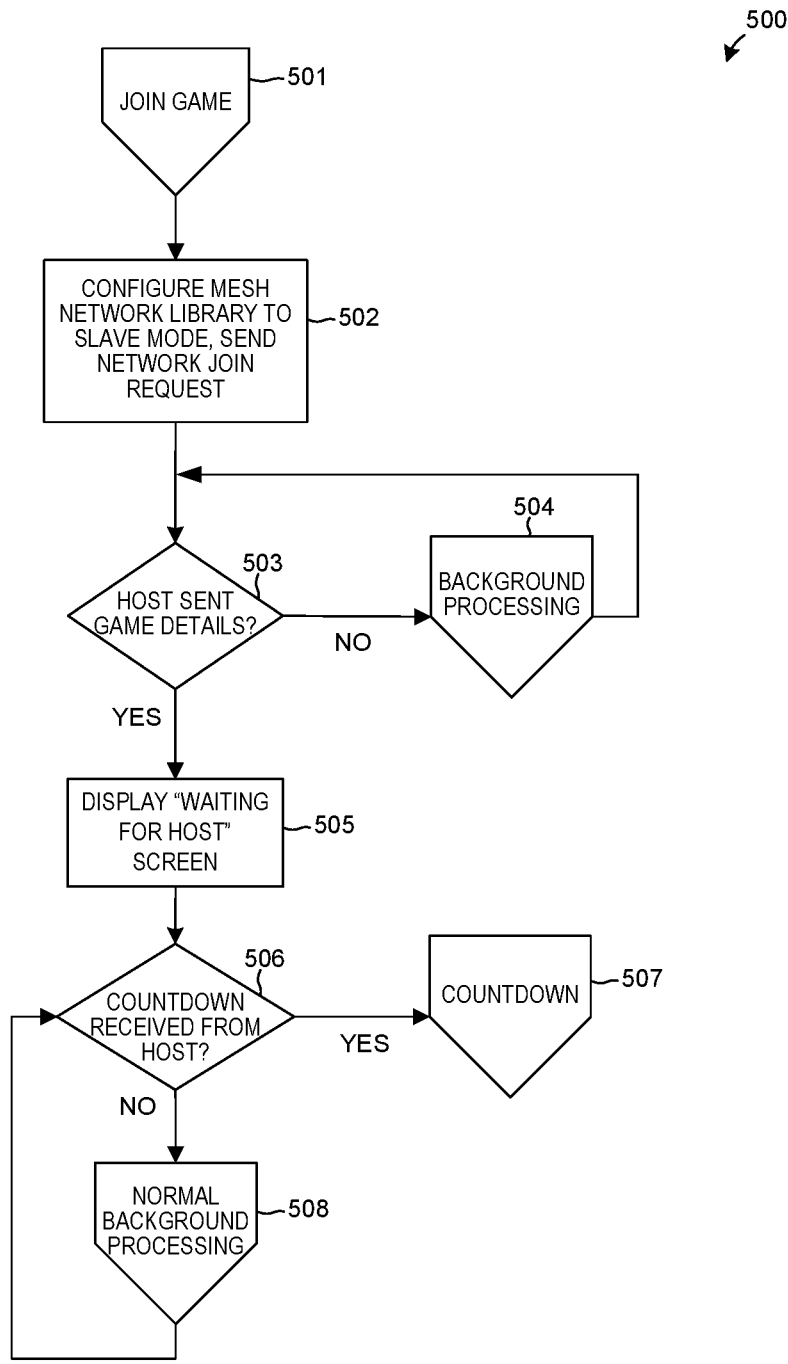
FIG. 17 is a flowchart of a method 500.

FIG. 17 is a flowchart of a method 500 in accordance with another novel aspect. At block 501, a join game operation is initiated. Next, at block 502, a mesh network library is configured in a slave mode and a network join request is sent. Next, at block 503, a determination is made as to whether game details were sent by the host. If it is determined at block 503 that game details were sent by the host, then the method proceeds to block 504. At block 504, background processing is performed, and the method returns to block 503. If, on the other hand, it is determined at block 503 that game details were not sent by the host, then the method proceeds to block 505.

At block 505, a "WAITING FOR HOST" screen is displayed. Next, at block 506, a determination is made as to whether a countdown was received from the host. If it is determined at block 506 that a countdown was received from the host, then the method proceeds to block 507 in which a countdown operation is performed. If, on the other hand, it is determined at block 506 that no countdown was received from the host, then the method proceeds to block 508. At block 508, normal background processing is performed and the method returns to block 506.

Figure 18:
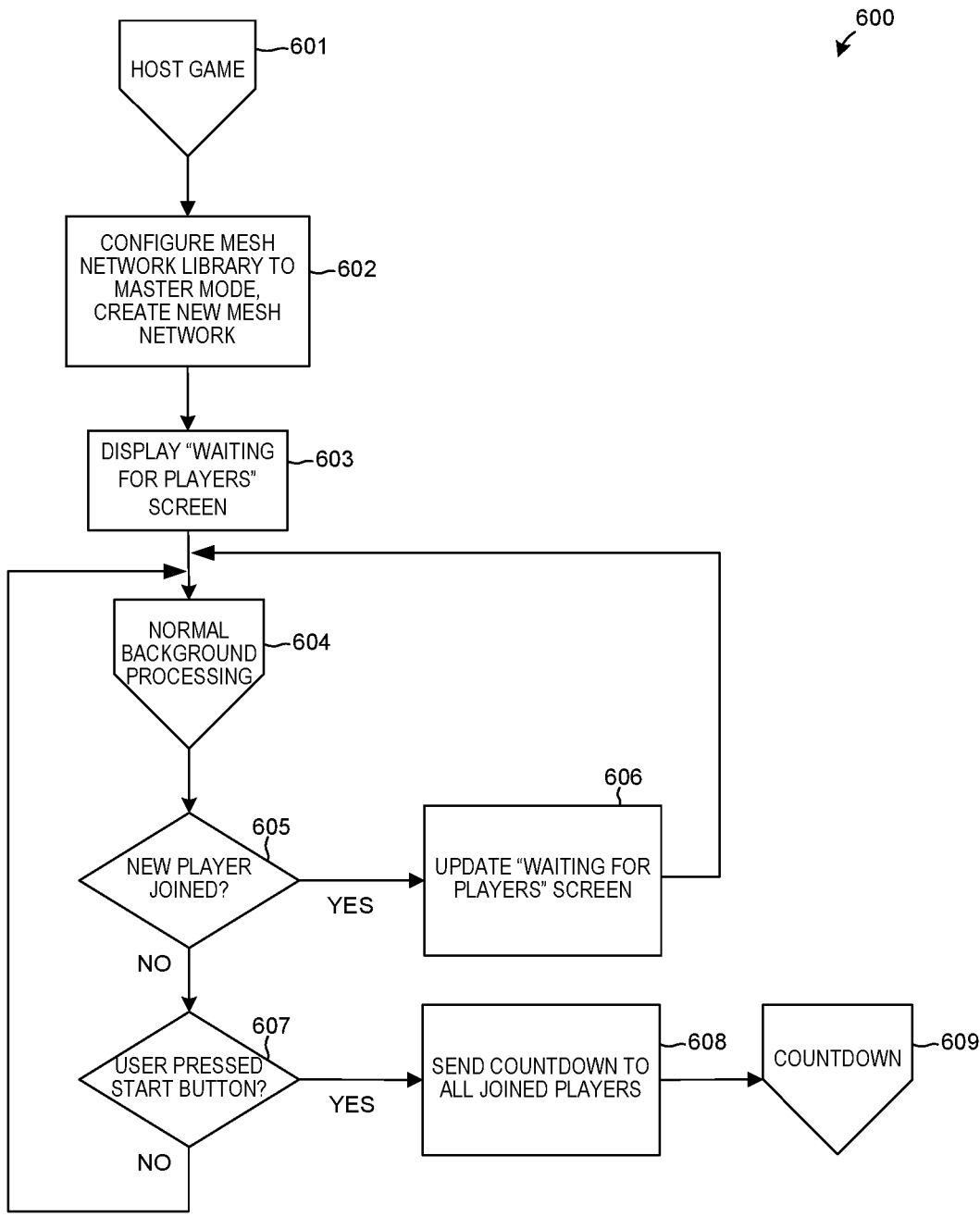
FIG. 18 is a flowchart of a method 600.

FIG. 18 is a flowchart of a method 600. Method 600 is one example of a game hosting operation. At block 601, a host game operation is initiated. Next, at block 602, a mesh network library is configured in a master mode and a new mesh network is created. Next, at block 603, a "WAITING FOR PLAYERS" screen is displayed. Next, at block 604, normal background processing is performed.

Next, at block 605, a determination is made as to whether a new player has joined the game. If it is determined at block 605 that a new player has joined the game, then the method proceeds to block 606 in which the "WAITING FOR PLAYERS" screen is updated, and the method returns to normal background processing at block 604. If, on the other hand, it is determined at block 605 that no new player has joined the game, then the method proceeds to block 507.

At block 607, a determination is made as to whether a user pressed a start button. If it is determined at block 607 that a user pressed a start button, then the method proceeds to block 608. At block 608, a countdown is sent to all joined players and the method proceeds to initiate countdown method at block 509. If, on the other hand, it is determined at block 607 that no user has pressed a start button, then the method returns to normal background processing at block 604.

Figure 19:
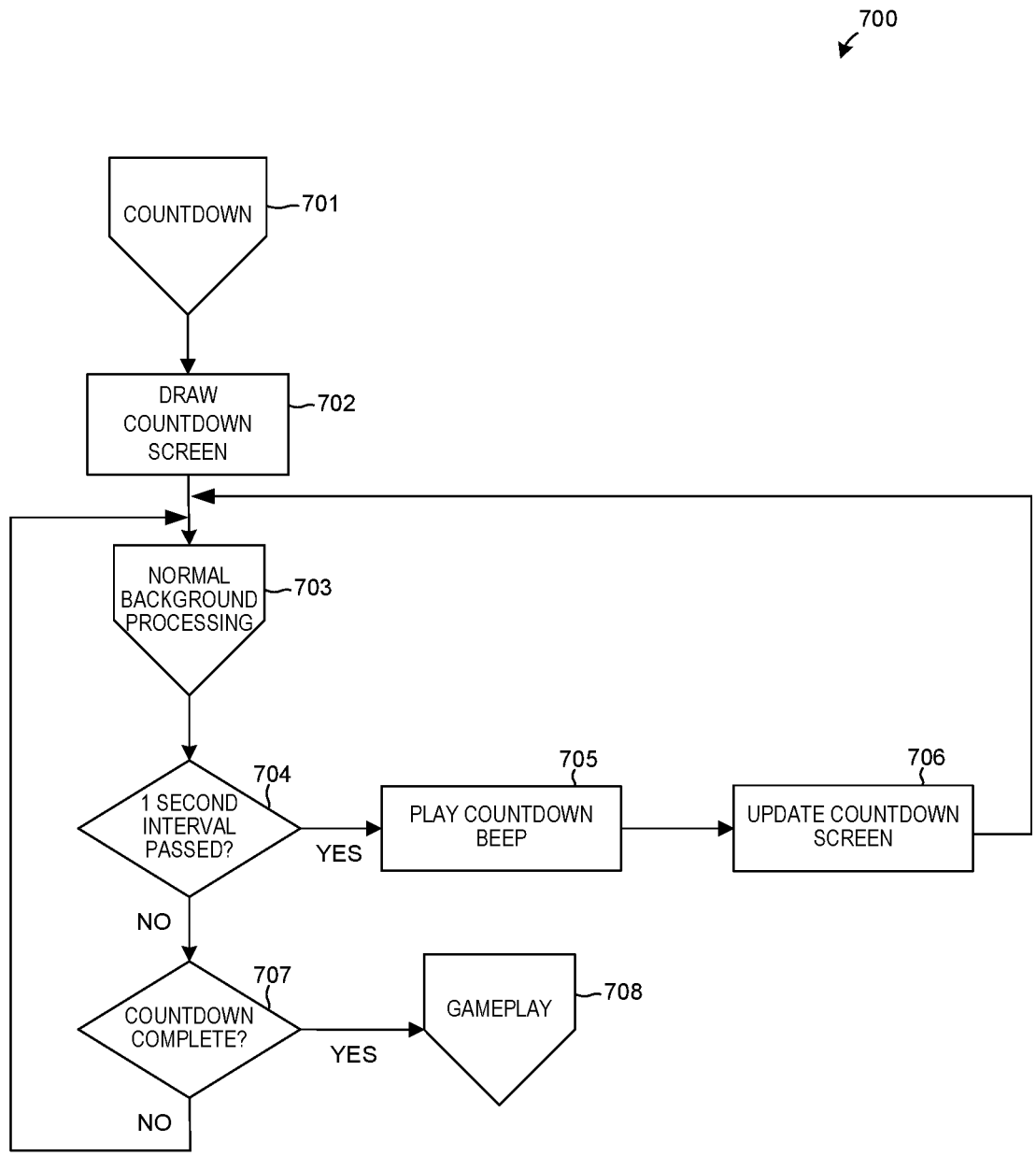
FIG. 19 is a flowchart of a method 700.

FIG. 19 is a flowchart of a method 700. Method 700 is one example of a countdown operation. At block 701, a countdown operation is initiated. Next, at block 702, a countdown screen is displayed. Next, at block 703, normal background processing is performed.

Next, at block 704, a determination is made as to whether a one second timer interval has elapsed. If it is determined at block 704 that a one second timer interval has elapsed, then the method proceeds to block 705. At block 705, a countdown beep is played. Next, at block 706, the countdown screen is updated, and the method returns to normal background processing at block 703. If, on the other hand, it is determined at block 704 that the one second timer interval has not elapsed, then the method proceeds to block 707.

At block 707, a determination is made as to whether the countdown is complete. If it is determined at block 707 that the countdown is complete, then the method proceeds to initiate gameplay operations at block 708. If, on the other hand, it is determined at block 707 that the countdown is not complete, then the method returns to normal background processing at block 703.

Figure 20A:
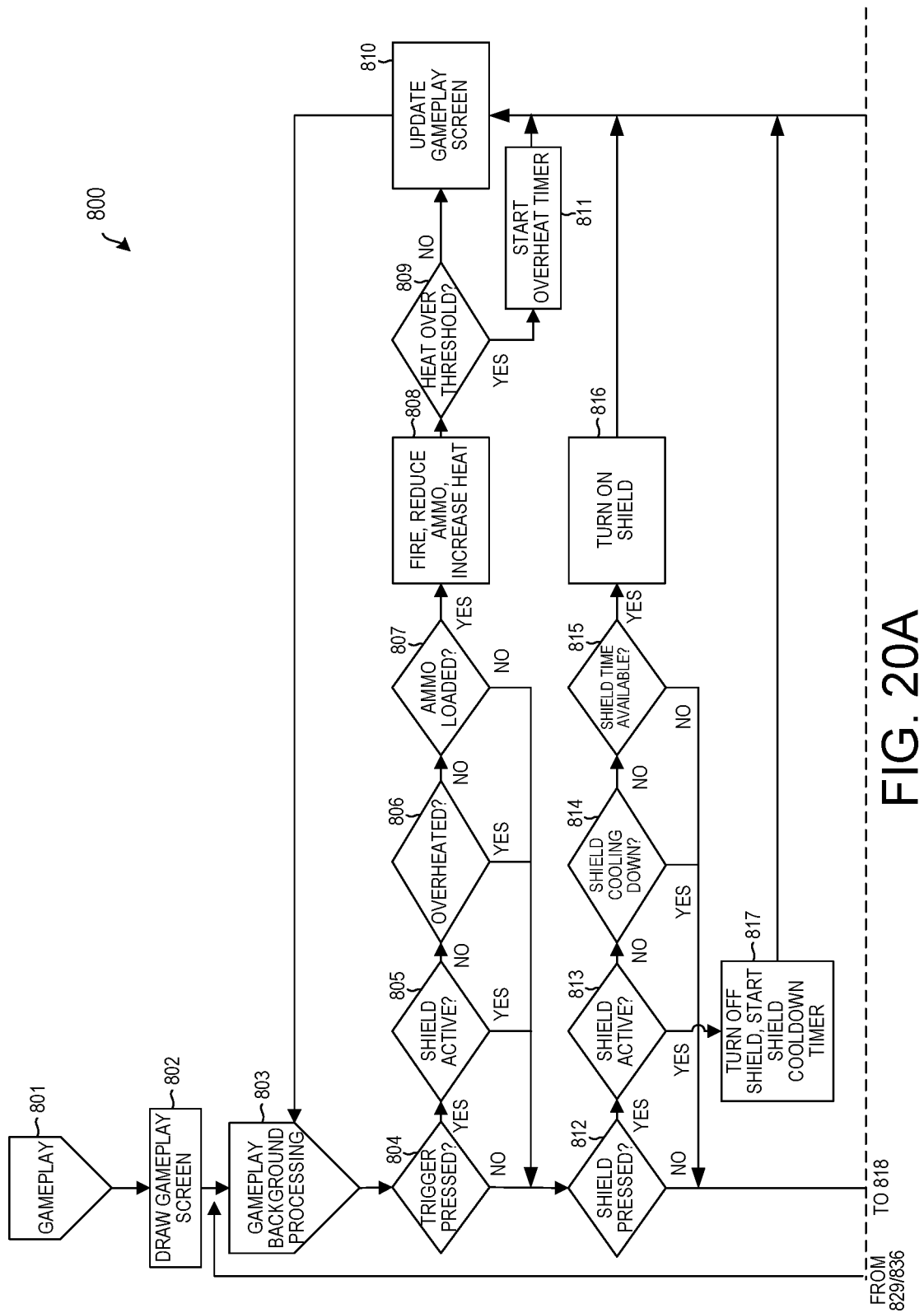
FIG. 20A and FIG. 20B, which together form
Figure 20B:
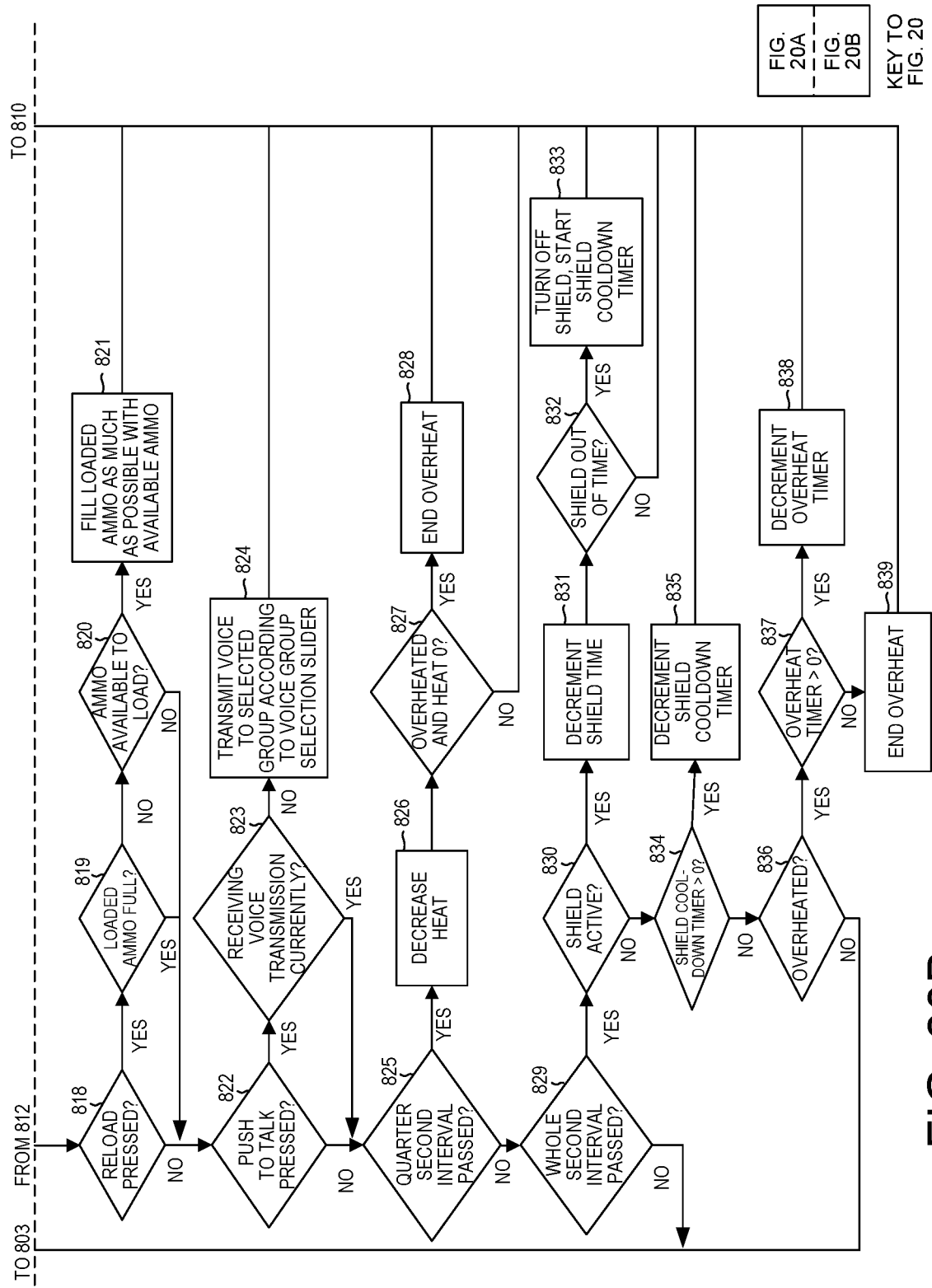

FIG. 20A and FIG. 20B, which together form FIG. 20, are a flowchart of a method 800. Method 800 is one example of a gameplay operation. At block 801, gameplay operation is initiated. Next, at block 801, a gameplay screen is displayed. Next, at block 803, gameplay background processing is performed. Next at block 804, a determination is made as to whether the trigger is pressed. If it is determined at block 804 that the trigger is pressed, then the method proceeds to block 805. If, on the other hand, it is determined at block 804 that the trigger is not pressed, then the method proceeds to block 812.

At block 805, a determination is made as to whether the shield is active. If it is determined at block 805 that the shield is active, then the method proceeds to block 806. If, on the other hand, it is determined at block 805 that the shield is not active, then the method proceeds to block 812.

At block 806, a determination is made as to whether an overheated condition is detected. If it is determined at block 806 that the overheated condition is not detected, then the method proceeds to block 807. If, on the other hand, it is determined at block 806 that the overheated condition is detected, then the method proceeds to block 812.

At block 807, a determination is made as to whether an ammunition loaded condition is detected. If it is determined at block 807 that the ammunition loaded condition is detected, then the method proceeds to block 808. If, on the other hand, it is determined at block 807 that the ammunition loaded condition is not detected, then the method proceeds to block 812.

At block 808, a fire operation is performed, ammunition count is reduced, and a heat count is increased. Next, at block 809, a determination is made as to whether the heat count exceeds a threshold. If it is determined at block 809 that the heat count does not exceed the threshold, then the method proceeds to update the gameplay screen at block 810 and to gameplay background processing at block 803. If, on the other hand, it is determined at block 809 that the heat count exceeds the threshold, then the method proceeds to start an overheat timer at block 811 and then to update the gameplay screen at block 810.

At block 812, a determination is made as to whether the shield button is pressed. If it is determined at block 812 that the shield button is pressed, then the method proceeds to block 813. If, on the other hand, it is determined at block 812 that the shield button is not pressed, then the method proceeds to block 818.

At block 813, a determination is made as to whether the shield is enabled. If it is determined at block 813 that the shield is not enabled, then the method proceeds to block 814. If, on the other hand, it is determined at block 813 that the shield is enabled, then the method proceeds to block 817. At block 817, the shield is disabled and a shield countdown timer is started. Next, the gameplay screen is updated at block 810.

At block 814, a determination is made as to whether a shield cool down condition is detected. If it is determined at block 814 that the shield cool down condition is not detected, then the method proceeds to block 815. If, on the other hand, it is determined at block 814 that the shield cool down condition is detected, then the method proceeds to block 818.

At block 815, a determination is made as to whether shield time is available. If it is determined at block 815 that shield time is available, then the method proceeds to block 816. Next, the shield is enabled at block 816 and the gameplay screen is updated at block 810. If, on the other hand, it is determined at block 815 that no shield time is available, then the method proceeds to block 818.

At block 818, a determination is made as to whether the reload button is pressed. If it is determined at block 818 that the reload button is pressed, then the method proceeds to block 819. If, on the other hand, it is determined at block 818 that the reload button is not pressed, then the method proceeds to block 822.

At block 819, a determination is made as to whether loaded ammunition is full. If it is determined at block 819 that loaded ammunition is not full, then the method proceeds to block 820. If, on the other hand, it is determined at block 819 that the loaded ammunition is full, then the method proceeds to block 822.

At block 820, a determination is made as to whether ammunition is available to load. If it is determined at block 820 that ammunition is available to load, then the method proceeds to fill loaded ammunition as much as possible with available ammunition at block 821 and to update the gameplay screen at block 810. If, on the other hand, it is determined at block 820 that no ammunition is available to load, then the method proceeds to block 822.

At block 822, a determination is made as to whether the push-to-talk button is pressed. If it is determined at block 822 that the push-to-talk button is pressed, then the method proceeds to block 823. If, on the other hand, it is determined at block 822 that the push-to-talk button is not pressed, then the method proceeds to block 825.

At block 823, a determination is made as to whether voice transmission is currently being received. If it is determined at block 823 that no voice transmission is currently being received, then voice is transmitted to selected group according to voice group selection slider at block 824 and the gameplay screen is updated at block 810. If, on the other hand, it is determined at block 823 that voice transmission is currently being received, then the method proceeds to block 825.

At block 825, a determination is made as to whether a quarter second time interval has elapsed. If it is determined at block 825 that the quarter second time interval has elapsed, then heat is decreased at block 826 and the method then proceeds to decision block 827. If, on the other hand, it is determined at block 825 that the quarter second time interval has not elapsed, then the method proceeds to block 825.

At block 827, a determination is made as to whether an overheat condition is detected and heat is zero. If it is determined at block 827 that the overheat condition is detected and heat is zero, then the overheat condition is ended at block 828 and the gameplay screen is updated at block 810. If, on the other hand, it is determined at block 827 that the overheat condition is not detected and heat is not zero, then the gameplay screen is updated at block 810.

At block 829, a determination is made as to whether a whole second time interval has elapsed. If it is determined at block 829 that the whole second time interval has elapsed, then the method proceeds to block 830. If, on the other hand, it is determined at block 829 that the whole second time interval has not elapsed, then the method proceeds to block 805.

At block 830, a determination is made as to whether the shield mode is active. If it is determined at block 830 that the shield mode is active, then the method proceeds to block 831. If, on the other hand, it is determined at block 830 that the shield mode is not active, then the method proceeds to block 834. At block 831, the shield time counter is decremented and the method proceeds to block 832.

At block 832, a determination is made as to whether the shield mode is out of time. If it is determined at block 830 that the shield mode is out of time, then the shield mode is disabled and a shield cooldown timer is started at block 833, and next, the gameplay screen is updated at block 810. If, on the other hand, it is determined at block 832 that the shield mode is not out of time, then the gameplay screen is updated at block 810.

At block 834, a determination is made as to whether the shield cool down timer is greater than zero. If it is determined at block 834 that the shield cool down timer is greater than zero, then the shield cool down timer is decremented at block 835, and next, the gameplay screen is updated at block 810. If, on the other hand, it is determined at block 834 that the shield cool down timer is not greater than zero, then the method proceeds to block 836.

At block 836, a determination is made as to whether an overheated condition is detected. If it is determined at block 836 that the overheated condition is detected, then the method proceeds to block 837. If, on the other hand, it is determined at block 836 that the overheated condition is not detected, then the method proceeds to perform gameplay background processing at block 803.

At block 837, a determination is made as to whether the overheat timer is greater than zero. If it is determined at block 837 that the overheat timer is greater than zero, then the overheat timer is decremented at block 838 and the method proceeds to update the gameplay screen at block 810. If, on the other hand, it is determined at block 837 that the overheat timer is not greater than zero, then the overheat condition is disabled at block 839 and the gameplay screen is updated at block 810.

Figure 21A:
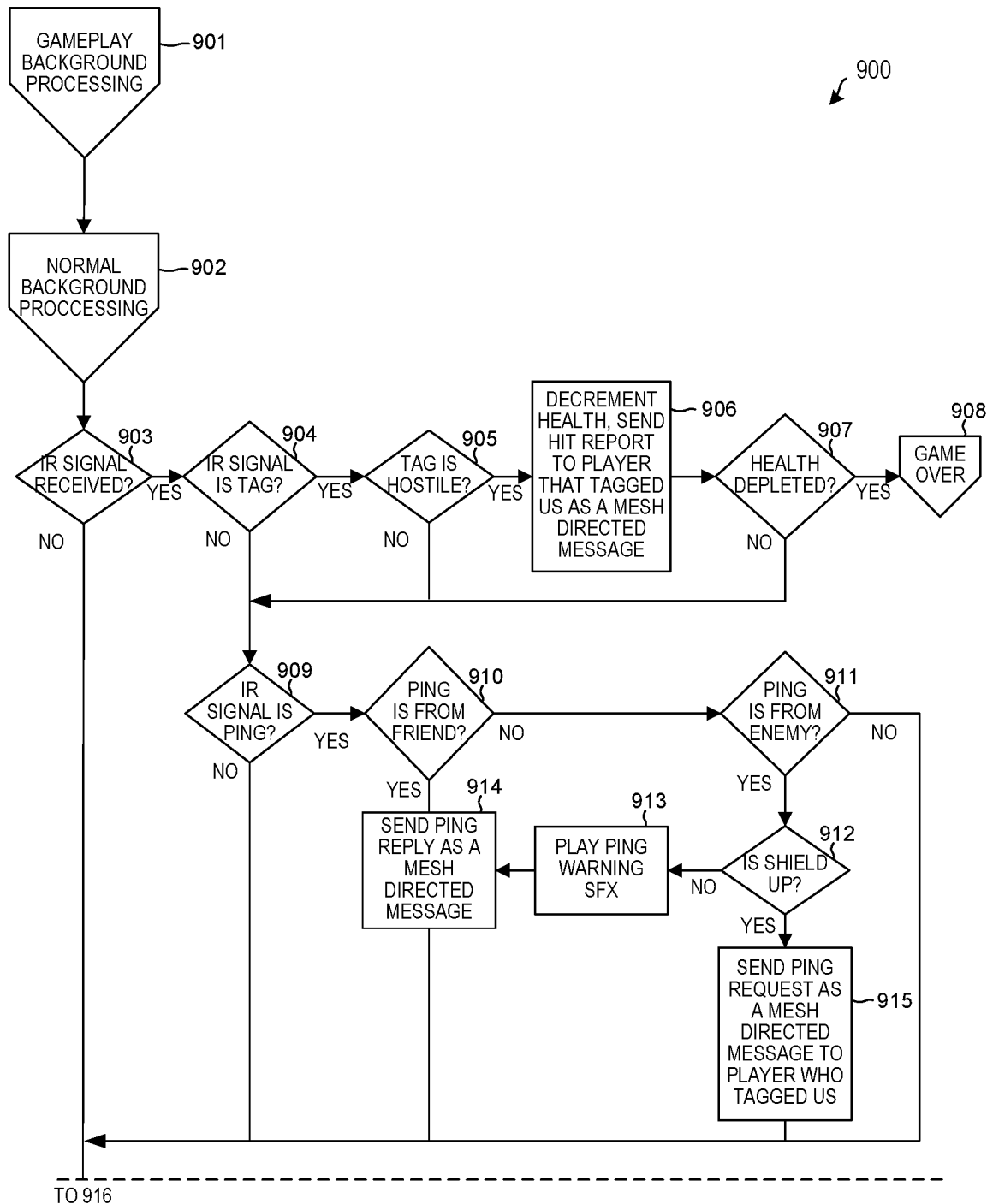
FIG. 21A and FIG. 21B, which together form
Figure 21B:
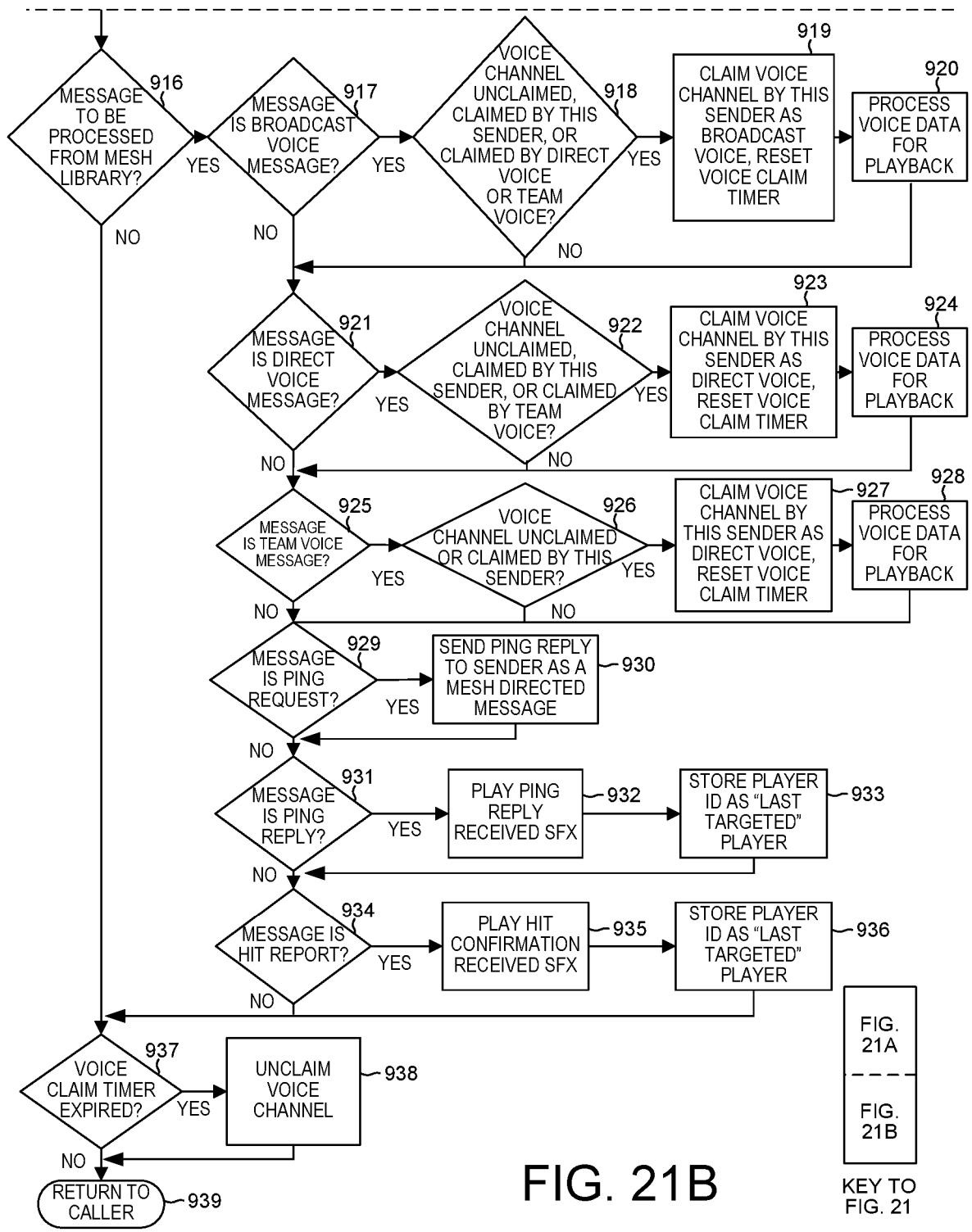

FIG. 21A and FIG. 213, which together form FIG. 21, are a flowchart of a method 900. Method 900 is one example of a gameplay background processing operation. At block 901, gameplay background operation is initiated. Next, at block 902, normal background processing is initiated. Next at block 903, a determination is made as to whether an infrared signal has been received. If it is determined at block 903 that an infrared signal has been received, then the method proceeds to block 904. If, on the other hand, it is determined at block 903 that no infrared signal has been received, then the method proceeds to block 904.

At block 904, a determination is made as to whether the received infrared signal is a tagging signal or "tag". If it is determined at block 904 that the received infrared signal was a tag, then the method proceeds to block 905. If, on the other hand, it is determined at block 904 that the received infrared signal was not a tag, then the method proceeds to block 909.

At block 905, a determination is made as to whether the received tag is hostile. If it is determined at block 904 that the received tag is hostile, then the method proceeds to block 906. At block 906, a health count is decremented, a hit report is sent to the player that tagged the gaming device as a mesh directed message, and the method next proceeds to block 907. If, on the other hand, it is determined at block 905 that the received tag is not hostile, then the method proceeds to block 909.

At block 907, a determination is made as to whether health is depleted. If it is determined at block 907 that health is depleted, then game over condition is initiated at block 908. If, on the game other hand, it is determined at block 907 that health is not depleted, then the method proceeds to block 909.

At block 909, a determination is made as to whether the received infrared signal is a ping signal. If it is determined at block 908 that the received infrared signal is a ping signal, then the method proceeds to block 910. If, on the other hand, it is determined at block 909 that the received infrared signal is not a ping signal, then the method proceeds to block 916.

At block 910, a determination is made as to whether the received infrared ping signal is from a friend. If it is determined at block 910 that the received infrared ping signal is from a friend, then a ping reply is sent as a mesh directed message at block 914 and the method proceeds to block 916. If, on the other hand, it is determined at block 910 that the received infrared ping signal is not from a friend, then the method proceeds to block 911.

At block 911, a determination is made as to whether the received infrared ping signal is from an enemy. If it is determined at block 911 that the received infrared ping signal is from an enemy, then the method proceeds to block 912. If, on the other hand, it is determined at block 911 that the received infrared ping signal is not from an enemy, then the method proceeds to block 916.

At block 912, a determination is made as to whether shield mode is enabled. If it is determined at block 912 that shield mode is enabled, then a ping request is sent as a mesh directed message to the player that tagged the gaming device at block 915 and then the method proceeds to block 916. If, on the other hand, it is determined at block 912 that the shield mode is not enabled, then a ping warning sound effect is played at block 913, a ping reply is sent as a mesh directed message at block 914 and then the method proceeds to block 916.

At block 916, a determination is made as to whether the message is to be processed from the mesh library. If it is determined at block 916 that the message is to be processed from the mesh library, then the method proceeds to block 917. If, on the other hand, it is determined at block 916 that the message is not to be processed from the mesh library, then the method proceeds to block 937.

At block 917, a determination is made as to whether the message is a broadcast voice message. If it is determined at block 917 that the message is a broadcast voice message, then the method proceeds to block 918. If, on the other hand, it is determined at block 917 that the message is not a broadcast voice message, then the method proceeds to block 921.

At block 918, a determination is made as to whether the voice channel is unclaimed, is claimed by this sender, or claimed by direct voice or team voice. If it is determined at block 918 that the voice channel is unclaimed, is claimed by this sender, or claimed by direct voice or team voice, then the method proceeds to block 919. At block 919, the voice channel is claimed by this sender as broadcast voice and the voice claim timer is reset. Next, at block 920, voice data is processed for playback. Next, the method proceeds to block 921. On the other hand, if it is determined at block 918 that the voice channel is not unclaimed, is not claimed by this sender, or not claimed by direct voice or team voice, then the method proceeds to block 921.

At block 921, a determination is made as to whether the message is a direct voice message. If it is determined at block 921 that the message is a direct voice message, then the method proceeds to block 922. If, on the other hand, it is determined at block 921 that the message is not a direct voice message, then the method proceeds to block 925.

At block 922, a determination is made as to whether the voice channel is unclaimed, is claimed by this sender, or claimed by team voice. If it is determined at block 922 that the voice channel is unclaimed, is claimed by this sender, or claimed by team voice, then the method proceeds to block 923. At block 923, the voice channel is claimed by this sender as direct voice message and the voice claim timer is reset. Next, at block 924, voice data is processed for playback. Next, the method proceeds to block 925. On the other hand, if it is determined at block 922 that the voice channel is not unclaimed, is not claimed by this sender, or not claimed by team voice, then the method proceeds to block 925.

At block 925, a determination is made as to whether the message is a team voice message. If it is determined at block 925 that the message is a team voice message, then the method proceeds to block 926. If, on the other hand, it is determined at block 925 that the message is not a team voice message, then the method proceeds to block 929.

At block 926, a determination is made as to whether the voice channel is unclaimed or is claimed by this sender. If it is determined at block 926 that the voice channel is unclaimed or is claimed by this sender, then the method proceeds to block 927. At block 927, the voice channel is claimed by this sender as direct voice message and the voice claim timer is reset. Next, at block 928, voice data is processed for playback. Next, the method proceeds to block 929. On the other hand, if it is determined at block 926 that the voice channel is not unclaimed or is not claimed by this sender, then the method proceeds to block 929.

At block 929, a determination is made as to whether the message is a ping request. If it is determined at block 929 that the message is a ping request, then a ping reply is sent to the sender as a mesh directed message at block 930 and the method proceeds to block 931. If, on the other hand, it is determined at block 929 that the message is not a ping request, then the method proceeds to block 931.

At block 931, a determination is made as to whether the message is a ping reply. If it is determined at block 931 that the message is a ping reply, then a ping reply sound effect is played at block 932, a player ID is stored as "LAST TARGETED PLAYER", and the method proceeds to block 934. If, on the other hand, it is determined at block 929 that the message is not a ping reply, then the method proceeds to block 934.

At block 931, a determination is made as to whether the message is a ping reply. If it is determined at block 931 that the message is a ping reply, then a ping reply sound effect is played at block 932, a player ID is stored as "LAST TARGETED PLAYER" at block 933, and the method proceeds to block 934. If, on the other hand, it is determined at block 929 that the message is not a ping reply, then the method proceeds to block 934.

At block 934, a determination is made as to whether the message is a hit report. If it is determined at block 934 that the message is a hit report, then a hit confirmation received sound effect is played at block 935, a player ID is stored as "LAST TARGETED PLAYER" at block 936, and the method proceeds to block 937. If, on the other hand, it is determined at block 934 that the message is not a hit report, then the method proceeds to block 937.

At block 937, a determination is made as to whether the voice claim timer has expired. If it is determined at block 937 that the voice claim timer has expired, then the voice channel is unclaimed at block 938 and the method proceeds to block 939. If, on the other hand, it is determined at block 937 that the voice claim timer has not expired, then the method proceeds to block 939. At block 939, control is returned to caller.

Figure 22:
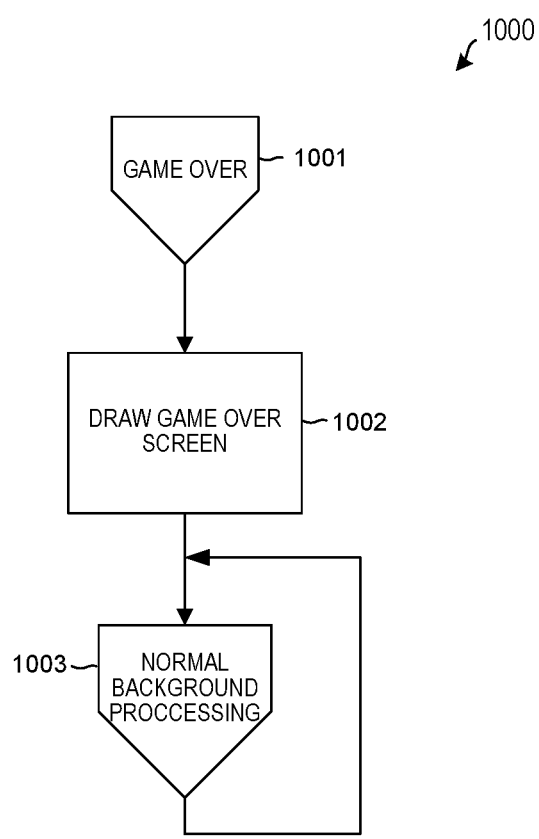
FIG. 22 is a flowchart of a method 1000.

FIG. 22 is a flowchart of a method 1000. Method 1000 is one example of a game over operation. At block 1001, a game over operation is initiated. Next, at block 1002, a game over screen is drawn on the display of the gaming device. Next, at block 1003, the method enters a normal background processing loop.

Figure 23:
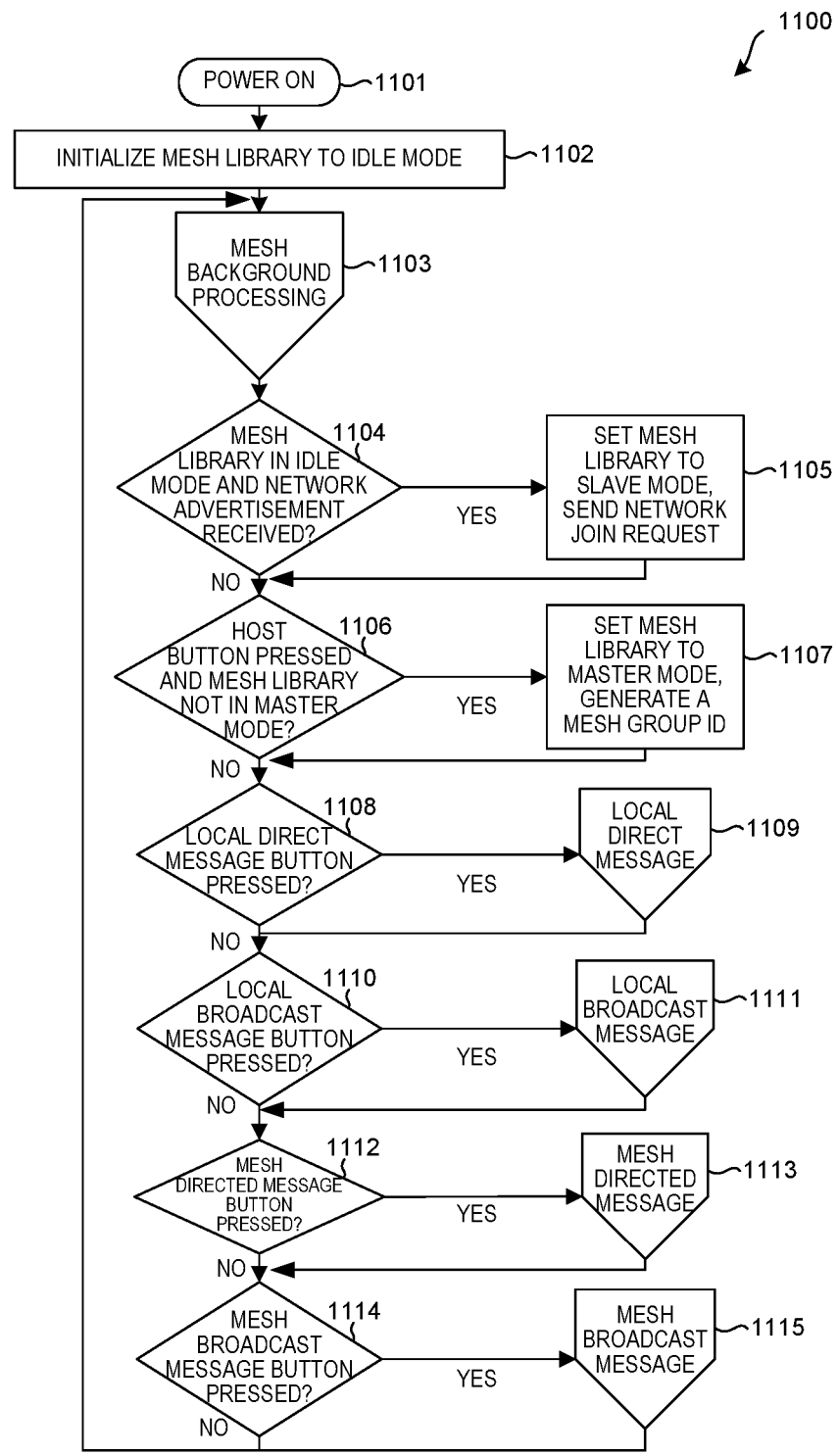
FIG. 23 is a flowchart of a method 1100.

FIGS. 23-27 show various embodiments of how the gaming device 100 communicates with other gaming devices over a radio mesh network. FIG. 23 is a flowchart of a method 1100. Method 1100 is one embodiment of how gaming device 100 communicates over the mesh network. At block 1101, a gaming device is powered on. Next, at block 1102, the mesh library is initialized in an idle mode. Next, at block 1103, mesh background processing is performed. Next, at block 1104, a determination is made as to whether the mesh library is in the idle mode and a network advertisement has been received. If it is determined at block 1104 that the mesh library is in the idle mode and a network advertisement has been received, then the mesh library is set to slave mode and a network join request is sent at block 1105 and the method proceeds to block 1106. If, on the other hand, it is determined at block 1104 that the mesh library is not in the idle mode or no network advertisement has been received, then the method proceeds to block 1106.

At block 1106, a determination is made as to whether the host button has been pressed and the mesh library is not in the master mode. If it is determined at block 1107 that the host button has been pressed and the mesh library is not in the master mode, then the mesh library is set to master mode and a mesh group ID is generated at block 1107 and the method proceeds to block 1108. If, on the other hand, it is determined at block 1104 that the host button has not been pressed or the mesh library is in the master mode, then the method proceeds to block 1108.

At block 1108, a determination is made as to whether a local direct message button has been pressed. If it is determined at block 1108 that a local direct message button has been pressed, then a local direct message operation is performed at block 1109 and the method proceeds to block 1110. If, on the other hand, it is determined at block 1108 that a local direct message button has not been pressed, then the method proceeds to block 1110.

At block 1110, a determination is made as to whether a local broadcast message button has been pressed. If it is determined at block 1110 that a local broadcast message button has been pressed, then a local broadcast message operation is performed at block 1111 and the method proceeds to block 1112. If, on the other hand, it is determined at block 1110 that a local broadcast message button has not been pressed, then the method proceeds to block 1112.

At block 1112, a determination is made as to whether a mesh directed message button has been pressed. If it is determined at block 1112 that a mesh directed message button has been pressed, then a mesh directed message operation is performed at block 1113 and the method proceeds to block 1114. If, on the other hand, it is determined at block 1112 that a mesh directed message button has not been pressed, then the method proceeds to block 1114.

At block 1114, a determination is made as to whether a mesh broadcast message button has been pressed. If it is determined at block 1114 that a mesh broadcast message button has been pressed, then a mesh broadcast message operation is performed at block 1115 and the method returns to mesh background processing at block 1103. If, on the other hand, it is determined at block 1114 that a mesh broadcast message button has not been pressed, then the method returns to mesh background processing at block 1103.

Figure 24A:
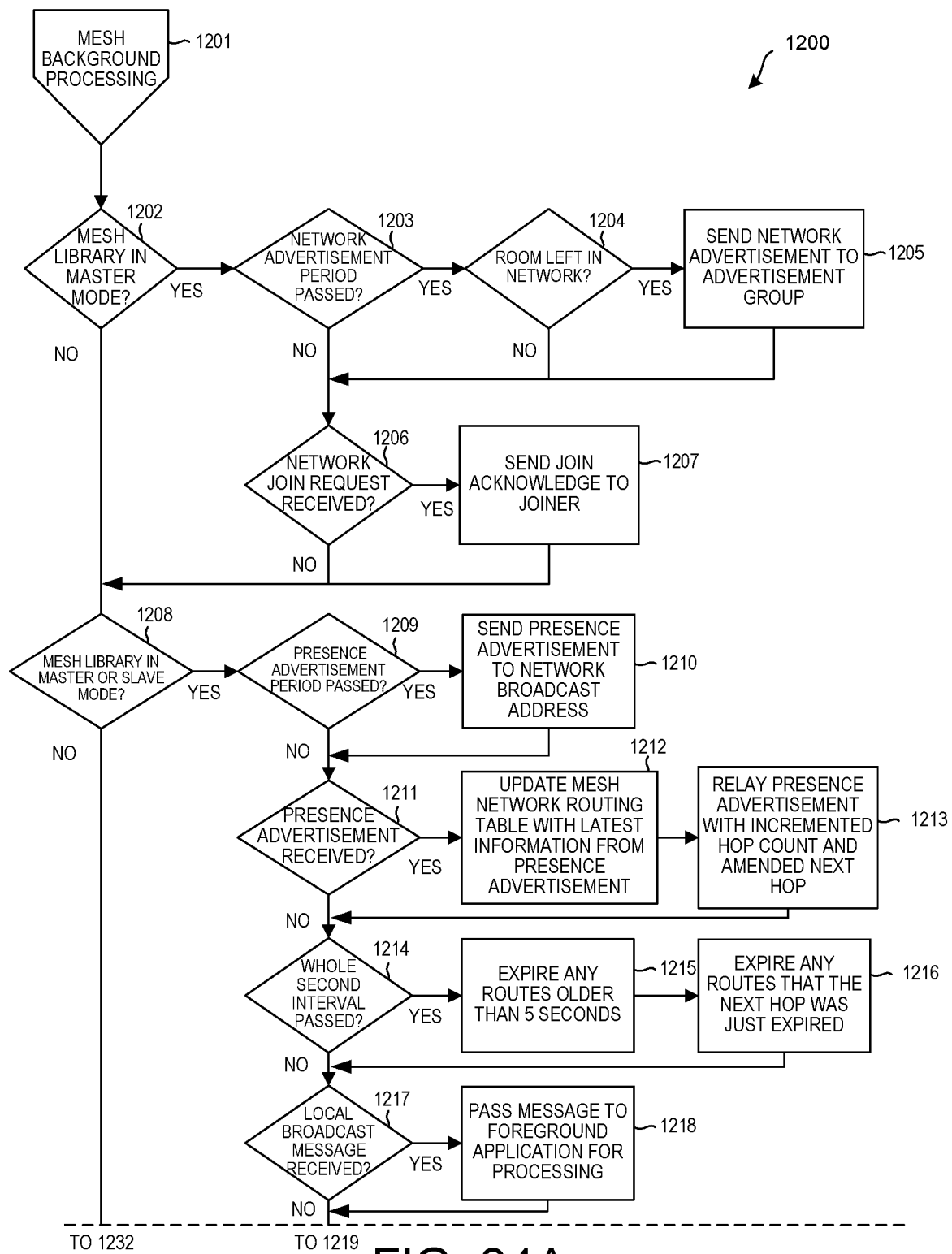
FIG. 24A and FIG. 24B, which together form
Figure 24B:
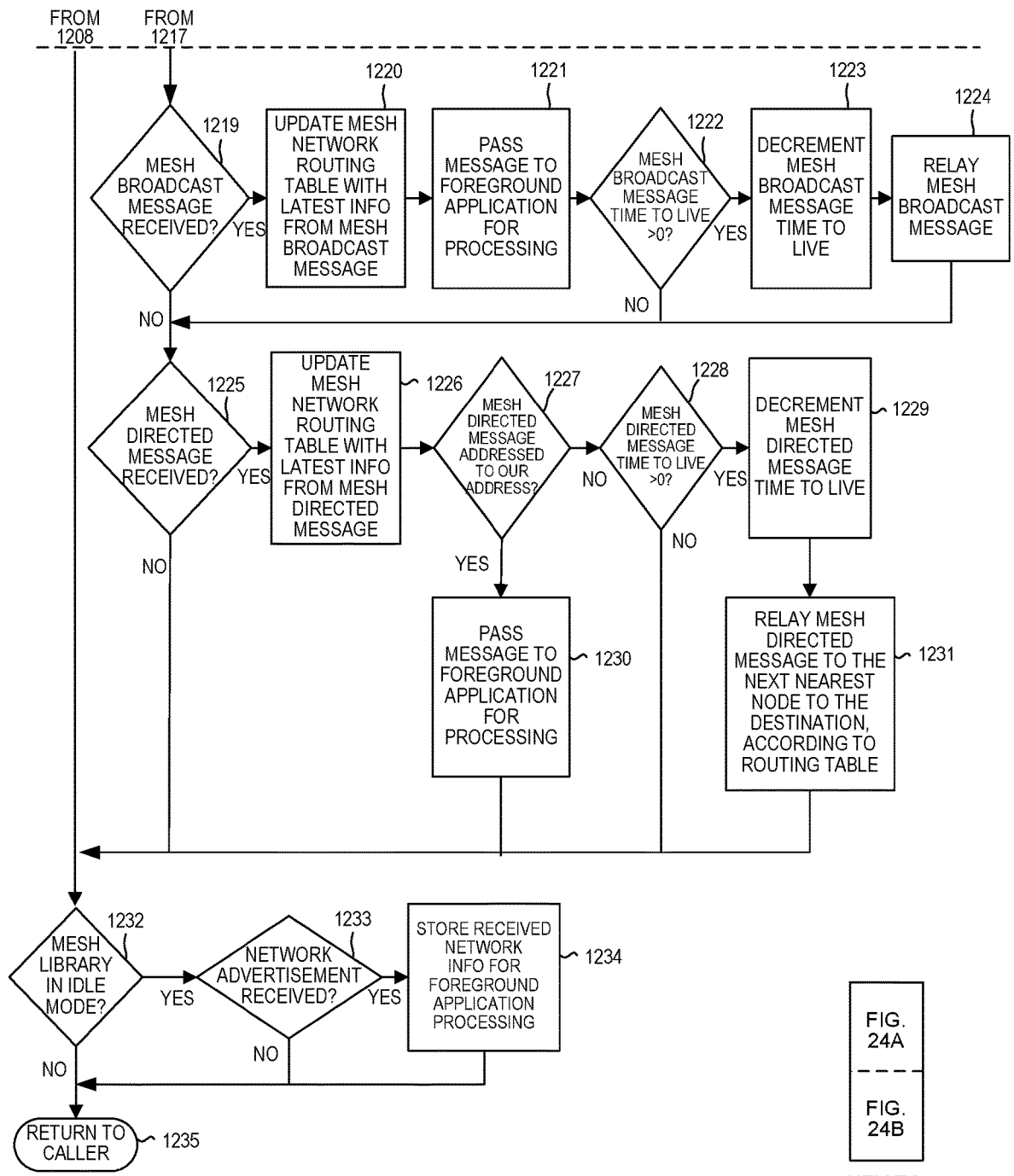

FIG. 24A and FIG. 24B, which together form FIG. 24, are a flowchart of a method 1200. Method 1200 is one example of a mesh communication background processing operation. At block 1201, mesh communication background processing is initiated. Next, at block 1202, a determination is made as to whether the mesh library is in a master mode. If it is determined at block 1202 that the mesh library is in the master mode, then the method proceeds to block 1203. If, on the other hand, it is determined at block 1202 that the mesh library is not in the master mode, then the method proceeds to block 1208.

At block 1203, a determination is made as to whether a network advertisement period has passed. If it is determined at block 1203 that a network advertisement period has passed, then the method proceeds to block 1204. If, on the other hand, it is determined at block 1203 that a network advertisement period has not passed, then the method proceeds to block 1206.

At block 1204, a determination is made as to whether room is left in the network. If it is determined at block 1204 that room is left in the network, then a network advertisement is sent to the advertisement group at block 1205 and the method proceeds to block 1206. If, on the other hand, it is determined at block 1204 that no room is available in the network, then the method proceeds to block 1206.

At block 1206, a determination is made as to whether a network join request has been received. If it is determined at block 1206 that a network join request has been received, then a join acknowledge communication is sent to the joiner at block 1207 and the method proceeds to block 1208. If, on the other hand, it is determined at block 1206 that no network join request has been received, then the method proceeds to block 1208.

At block 1208, a determination is made as to whether the mesh library is in a master or slave mode. If it is determined at block 1208 that the mesh library is in a master or slave mode, then the method proceeds to block 1209. If, on the other hand, it is determined at block 1208 that the mesh library is not in a master or slave mode, then the method proceeds to block 1232.

At block 1209, a determination is made as to whether a presence advertisement period has passed. If it is determined at block 1209 that a presence advertisement period has passed, then a presence advertisement communication is sent to the network broadcast address at block 1210 and the method then proceeds to block 1211. If, on the other hand, it is determined at block 1209 that the presence advertisement period has not passed, then the method proceeds to block 1211.

At block 1211, a determination is made as to whether a presence advertisement has been received. If it is determined at block 1211 that a presence advertisement has been received, then the method proceeds to block 1212. At block 1212, the mesh network routing table is updated with the latest information from the present advertisement. Next, at block 1213, the presence advertisement is relayed with an incremented hop count and amended next hop. Next, the method proceeds to block 1214. If, on the other hand, it is determined at block 1211 that no presence advertisement has been received, then the method proceeds to block 1214.

At block 1214, a determination is made as to whether a whole second time interval has elapsed. If it is determined at block 1214 that a whole second time interval has elapsed, then the method proceeds to block 1215. At block 1215, any routes older than five seconds are expired. Next, at block 1216, any routes for which the next was just expired are also expired. Next, the method proceeds to block 1217. If, on the other hand, it is determined at block 1214 that the whole second time interval has not elapsed, then the method proceeds to block 1217.

At block 1217, a determination is made as to whether a local broadcast message has been received. If it is determined at block 1217 that a local broadcast message has been received, then the message is passed to the foreground application for processing at block 1218 and the method next proceeds to block 1219. If, on the other hand, it is determined at block 1217 that no local broadcast message has been received, then the method proceeds to block 1219.

At block 1219, a determination is made as to whether a mesh broadcast message has been received. If it is determined at block 1219 that a mesh broadcast message has been received, then the method proceeds to block 1220. At block 1220, the mesh network routing table is updated with the latest information from the mesh broadcast message. Next, at block 1221, the message is passed to the foreground application for processing, and the method then proceeds to block 1222. If, on the other hand, it is determined at block 1219 that no mesh broadcast message has been received, then the method proceeds to block 1225.

At block 1222, a determination is made as to whether a mesh broadcast message time to live is greater than zero. If it is determined at block 1222 that the mesh broadcast message time to live is greater than zero, then the method proceeds to block 1223. At block 1223, the mesh broadcast message time to live is decremented. Next, at block 1224, the mesh broadcast message is relayed, and the method then proceeds to block 1225. If, on the other hand, it is determined at block 1222 that the mesh broadcast message time to live is not greater than zero, then the method proceeds to block 1225.

At block 1225, a determination is made as to whether a mesh directed message has been received. If it is determined at block 1225 that a mesh directed message has been received, then the method proceeds to block 1226. At block 1226, the mesh network routing table is updated with the latest information from the mesh directed message. The method next proceeds to block 1227. If, on the other hand, it is determined at block 1225 that no mesh directed message has been received, then the method proceeds to block 1232.

At block 1227, a determination is made as to whether the mesh directed message is addressed to the address of this gaming device. If it is determined at block 1227 that the mesh directed message is addressed to the address of this gaming device, then the message is passed to the foreground application for processing at block 1230, and the method then proceeds to block 1232. If, on the other hand, it is determined at block 1227 that the mesh directed message is not addressed to the address of this gaming device, then the method proceeds to block 1228.

At block 1228, a determination is made as to whether the mesh directed message time to live is greater than zero. If it is determined at block 1228 that the mesh directed message time to live is greater than zero, then the method proceeds to block 1229. At block 1229, the mesh directed message time to live is decremented. Next, at block 1231, the mesh directed message is relayed to the next nearest node to the destination according to the mesh networking routing table. Next, the method then proceeds to block 1232. If, on the other hand, it is determined at block 1228 that the mesh directed message time to live is not greater than zero, then the method proceeds to block 1232.

At block 1232, a determination is made as to whether the mesh library is in an idle mode. If it is determined at block 1232 that the mesh library is in the idle mode, then the method proceeds to block 1233. If, on the other hand, it is determined at block 1232 that the mesh library is not in the idle mode, then the method proceeds to block 1235.

At block 1235, a determination is made as to whether a network advertisement has been received. If it is determined at block 1235 that a network advertisement has been received, then the method proceeds to block 1234. At block 1234, received network information is stored for foreground application processing. Next, the method proceeds to block 1235. If, on the other hand, it is determined at block 1233 that no network advertisement has been received, then the method proceeds to block 1235. At block 1235, control is returned to the caller.

Figure 25:
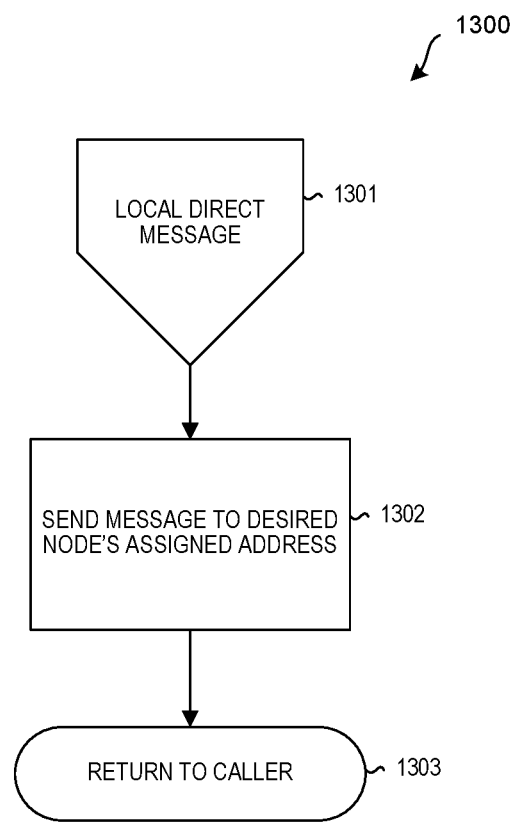
FIG. 25 is a flowchart of a method 1300.

FIG. 25 is a flowchart of a method 1300. Method 1300 is one embodiment of a local direct message communication over a radio mesh network. At block 1301, a local direct message communication is initialized. Next, at block 1302, a message is sent to the desired node's assigned address. Next, at block 1203, control is returned to the caller.

Figure 26:
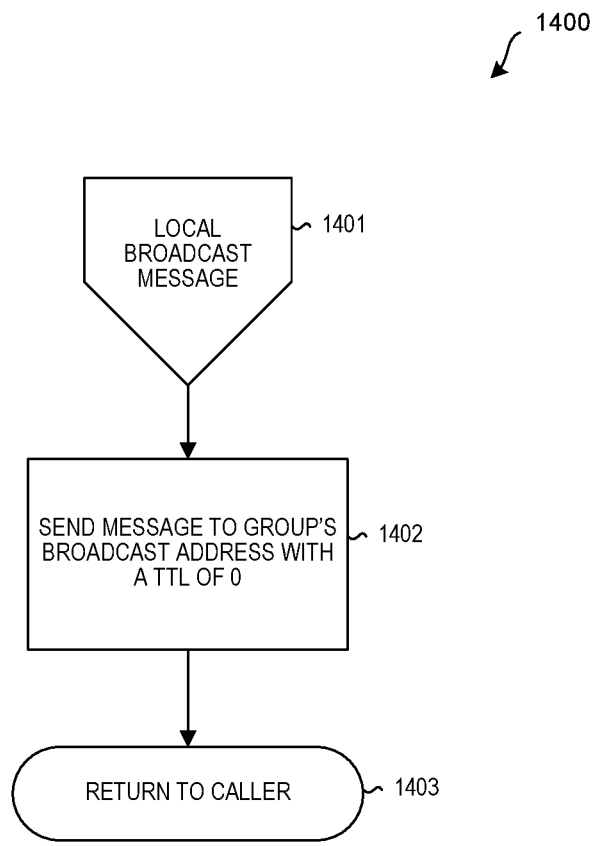
FIG. 26 is a flowchart of a method 1400.

FIG. 26 is a flowchart of a method 1400. Method 1400 is one embodiment of a local broadcast message communication over a radio mesh network. At block 1401, a local broadcast message communication is initialized. Next, at block 1402, a message is sent to the group's broadcast address with a time to live of zero. Next, at block 1403, control is returned to the caller.

Figure 27:
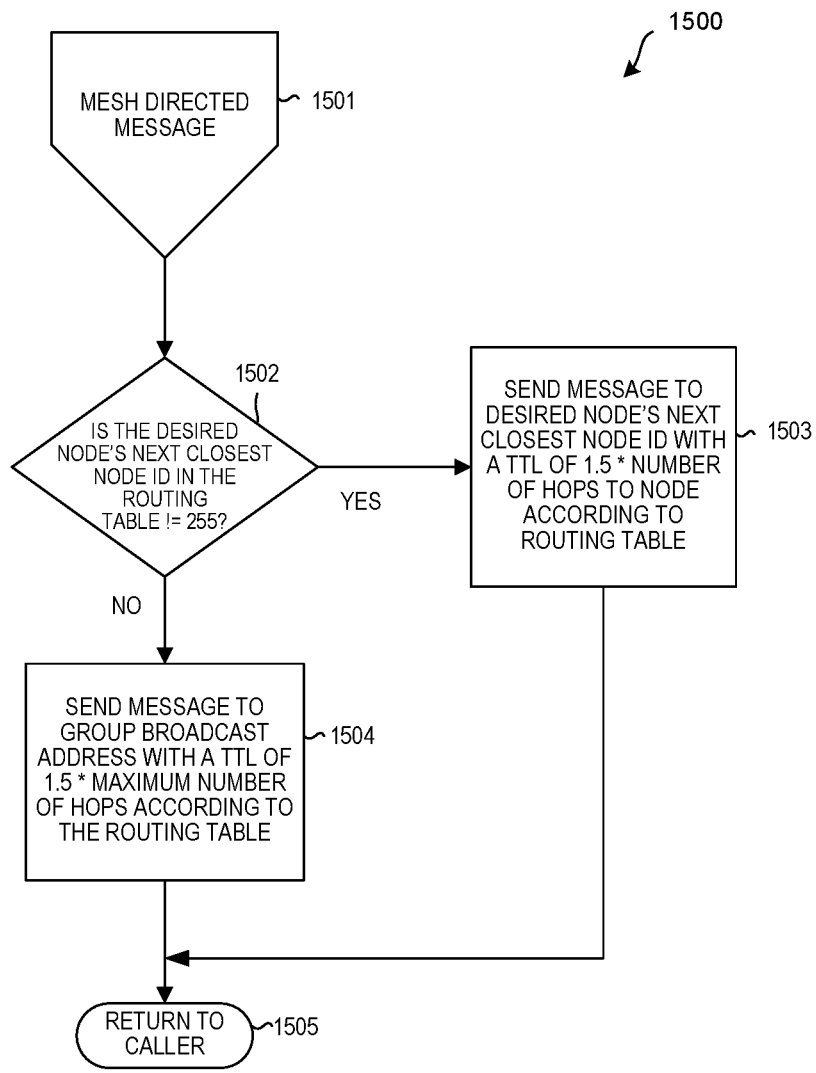
FIG. 27 is a flowchart of a method 1500.

FIG. 27 is a flowchart of a method 1500. Method 1500 is one embodiment of a mesh directed message communication over a radio mesh network. At block 1501, a mesh directed message communication is initialized. Next, at block 1502, a determination is made as to whether the desired node's next closest node identifier in the routing table not equal to two-hundred and fifty-five. If it is determined at block 1502 that the desired node's next closest node identifier in the routing table not equal to two-hundred and fifty-five, then the method proceeds to block 1503. At block 1503, a message is sent to the desired node's next closest node identifier with a time to live of 1.5 multiplied by a number of hops to node according to routing information stored in the routing table. Next, the method proceeds to block 1505. If, on the other hand, it is determined at block 1502 that the desired node's next closest node identifier in the routing table is equal to two-hundred and fifty-five, then the method proceeds to block 1504. At block 1504, a message is sent to the group broadcast address with a time to live of 1.5 multiplied by a maximum number of hops according to routing information stored in the routing table. Next, the method proceeds to block 1505. At block 1505, control is returned to the caller.

Figure 28:
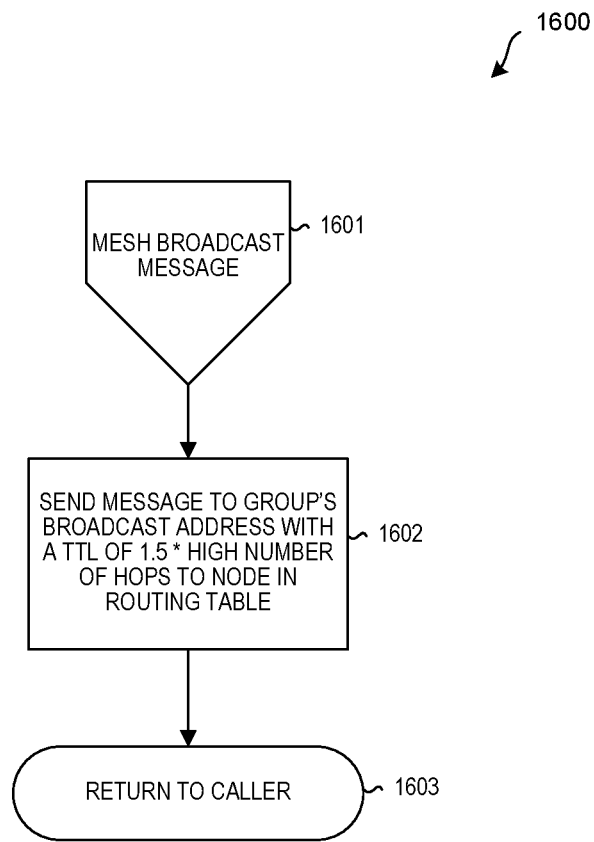
FIG. 28 is a flowchart of a method 1600.

FIG. 28 is a flowchart of a method 1600. Method 1600 is one embodiment of a mesh broadcast message communication over a radio mesh network. At block 1601, a mesh broadcast message communication is initialized. Next, at block 1602, a message is sent to the group's broadcast address with a time to live of 1.5 multiplied by a highest number of hops to node in the routing table. Next, at block 1603, control is returned to the caller.

Although certain specific embodiments are described above for instructional purposes, the teachings of this patent document have general applicability and are not limited to the specific embodiments described above. The function of the hardware circuitry illustrated in the figures can be implemented in hardware circuitry as shown, or in a combination of dedicated hardware circuitry and software, or largely in software. It will also be appreciated by those of ordinary skill in the art that the claimed inventions do not apply to only laser tag games and apply to other types of multi-player games. Accordingly, various modifications, adaptations, and combinations of various features of the described embodiments can be practiced without departing from the scope of the invention as set forth in the claims.

What is claimed is:

1. An apparatus comprising:
a controller that maintains a routing table and game state information, wherein the apparatus forms a node of a mesh network, wherein the routing table stores next hop information usable to communicate information to other nodes of the mesh network, wherein the apparatus is a first gaming device, wherein the mesh network involves a second gaming device, and wherein the first gaming device communicates information to the second gaming device over the mesh network in accordance with the next hop information stored in the routing table of the first gaming device.

2. The apparatus of claim 1, wherein the mesh network determines a playing area of a game, and wherein the playing area of the game is alterable based in part on a location of the first gaming device.

3. The apparatus of claim 1, wherein the first gaming device does not include any circuitry that communicates with a cellular network.

4. The apparatus of claim 1, wherein the mesh network involves a third gaming device, wherein the first gaming device and the third gaming device communicate over the mesh network via a first communication and a second communication, wherein the first communication is between the first gaming device and the second gaming device in accordance with next hop information stored in the routing table of the first gaming device, and wherein the second communication is between the second gaming device and the third gaming device in accordance with next hop information stored in a routing table of the second gaming device.

5. The apparatus of claim 1, further comprising:
a radio communication circuit, wherein the mesh network is a radio mesh network, and wherein the first gaming device communicates information across the radio mesh network using the radio communication circuit.

6. The apparatus of claim 1, further comprising:
a battery, wherein the battery supplies circuitry within the first gaming device; and
an enclosure, wherein the controller is disposed within the enclosure.

7. The apparatus of claim 1, further comprising:
an optical receiver, wherein a signal detected by the optical receiver causes the controller to alter game state information and communicate updated game state information across the mesh network.

8. An apparatus comprising:
a controller that maintains a routing table and game state information, wherein the apparatus forms a node of a mesh network, wherein the routing table stores next hop information usable to communicate information to other nodes of the mesh network, wherein the apparatus is a first gaming device, wherein the mesh network involves a second gaming device, the first gaming device further comprising:
an optical transmitter, wherein a signal output by the optical transmitter is detected by the second gaming device, wherein the signal detected by the second gaming device causes a change in game state information, and wherein the change in the game state information is communicated to at least one other gaming device over the mesh network.

9. An apparatus comprising:

a controller that maintains a routing table and game state information, wherein the apparatus forms a node of a mesh network, wherein the routing table stores next hop information usable to communicate information to other nodes of the mesh network, and wherein information communicated from the apparatus to another node of the mesh network comprises at least one type of information taken from the group consisting of: textual information, visual information, and audio information.

10. A method comprising:

configuring a mesh network with a plurality of gaming devices, wherein an extent of the mesh network depends in part upon a location of the gaming devices, and wherein each of the gaming devices maintains a routing table that stores next hop information usable to communicate information across the mesh network;

communicating information from a first gaming device of the gaming devices to a second gaming device of the gaming devices in accordance with the next hop information stored in the routing table of the first gaming device; and communicating at least part of the information from the second gaming device to a third gaming device of the gaming devices in accordance with the next hop information stored in the routing table of the second gaming device.

11. The method of claim 10, further comprising:

communicating game state information from one of the gaming devices to at least one other of the gaming devices across the mesh network.

12. The method of claim 11, wherein the communicating occurs in response to detecting a game event.

13. The method of claim 10, wherein the extent of the mesh network changes as the gaming devices change locations.

14. The method of claim 10, wherein none of the gaming devices includes circuitry that communicates with a cellular base station.

15. The method of claim 10, wherein the mesh network is a radio mesh network, and wherein the gaming devices communicate information across the radio mesh network via radio communication.

16. An apparatus comprising:

an enclosure; and means for maintaining a routing table and game state information, wherein the apparatus forms a node of a mesh network, wherein the routing table stores next hop information usable to communicate information to other nodes of the mesh network, wherein the apparatus is a gaming device, wherein the means is disposed within the enclosure, wherein the apparatus includes no cellular network circuitry, wherein the mesh network determines a playing area of a game, and wherein the playing area of the game is changeable as the gaming device moves throughout the playing area.

17. The apparatus of claim 16, wherein the means is a controller, and wherein the controller is part of an integrated circuit.

* * * * *